(12) United States Patent
Wang et al.

(10) Patent No.: US 10,601,305 B2
(45) Date of Patent: Mar. 24, 2020

(54) CONTROL TO OUTPUT DYNAMIC RESPONSE AND EXTEND MODULATION INDEX RANGE WITH HYBRID SELECTIVE HARMONIC CURRENT MITIGATION-PWM AND PHASE-SHIFT PWM FOR FOUR-QUADRANT CASCADED H-BRIDGE CONVERTERS

(71) Applicant: University of Florida Research Foundation, Incorporated, Gainesville, FL (US)

(72) Inventors: Shuo Wang, Gainesville, FL (US); Hui Zhao, Gainesville, FL (US); Amirhossein Moeini, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/883,390

(22) Filed: Jan. 30, 2018

(65) Prior Publication Data

US 2020/0052575 A1    Feb. 13, 2020

Related U.S. Application Data

(60) Provisional application No. 62/454,997, filed on Feb. 6, 2017.

(51) Int. Cl.
*H02M 1/12* (2006.01)
*H02M 1/08* (2006.01)
*H02M 1/42* (2007.01)

(52) U.S. Cl.
CPC ............... *H02M 1/12* (2013.01); *H02M 1/08* (2013.01); *H02M 1/4208* (2013.01); *H02M 1/4225* (2013.01); *Y02B 70/126* (2013.01)

(58) Field of Classification Search
CPC ........ Y02B 70/126; H02M 1/08; H02M 1/12; H02M 1/4208; H02M 1/4225; H02M 7/49;
(Continued)

(56) References Cited

U.S. PATENT DOCUMENTS 8,687,388 B2 * 4/2014 Jang ..................... H02M 1/4216
363/44
8,891,261 B2 * 11/2014 Jang ..................... H02M 1/4216
363/44
(Continued)

OTHER PUBLICATIONS

Phase-Shifted Carrier Pulse Width Modulation Based on Particle Swarm Optimization for Cascaded H-bridge Multilevel Inverters with Unequal DC Voltages Xin-Jian Cai 1,2,3, Zhen-Xing Wu 3, Quan-Feng Li 4 and Shu-Xiu Wang 3 (Year: 2015).*
(Continued)

*Primary Examiner* — Yemane Mehari
(74) *Attorney, Agent, or Firm* — Alston & Bird LLP

(57) ABSTRACT

A hybrid Cascaded H-Bridge (CHB) converter can include a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, a modulation selector coupled to the output signal $SW_{SHCM}$ of the SHCM-PWM unit and the output signal $SW_{PS}$ of the PSPWM unit and providing an output signal SW, and a CHB converter coupled to the output signal SW of the modulation selector. The modulation selector can select one of the output signals ($SW_{SHCM}$ and $SW_{PS}$) as the output signal SW based on the input current.

24 Claims, 15 Drawing Sheets

(58) Field of Classification Search
CPC .... H02M 7/219; H02M 7/487; H02M 7/5395; H02M 2001/0077; H02M 2001/123; H02J 3/01
USPC .................................................. 363/39, 44
See application file for complete search history.

(56) References Cited

U.S. PATENT DOCUMENTS

| | | | |
|---|---|---|---|
| 10,218,285 B2 | 2/2019 | Mihalache | |
| 10,243,446 B2 | 3/2019 | Wang et al. | |
| 2008/0144342 A1* | 6/2008 | Du | H02M 7/49 363/71 |
| 2009/0102436 A1* | 4/2009 | Escobar Valderrama | H02J 3/1857 323/207 |
| 2015/0200602 A1* | 7/2015 | Narimani | H02M 5/4585 363/37 |
| 2017/0110977 A1 | 4/2017 | Mihalache | |
| 2018/0226879 A1* | 8/2018 | Wang | H02M 1/126 |

OTHER PUBLICATIONS

Dahidah et al., "A review of multilevel selective harmonic elimination PWM: formulations, solving algorithms, Implementation and applications," IEEE Transactions on Power Electronics, Sep. 2014, pp. 1-16.

He et al., "High-performance indirect current control scheme for railway traction four-quadrant converters," IEEE Transactions on Industrial Electronics, Dec. 2014, pp. 6645-6654, vol. 61, No. 12.

Franquelo et al., "A flexible selective harmonic mitigation technique to meet grid codes in three-level PWM converters," IEEE Transactions on Industrial Electronics, Dec. 2007, pp. 1-7.

Moeini et al., "Selective harmonic mitigation-pulse-width modulation technique with variable DC-link voltages in single and three-phase cascaded H-bridge inverters," IET Power Electronics, Apr. 2014, pp. 1-9.

"IEEE recommended practices and requirements for harmonic control in electrical power systems," IEEE Std 619-1992, Apr. 1993, pp. 1-100.

Reyes-Sierra et al., "Multi-objective particle swarm optimizers: a survey of the state-of-the-art," International Journal of Computational Intelligence Research, Jan. 2006, pp. 287-308, vol. 2, No. 3.

Watson et al., "A complete harmonic elimination approach to DC link voltage balancing for a cascaded multilevel rectifier," IEEE Transactions on Industrial Electronics, Dec. 2007, pp. 2946-2953, vol. 54, No. 6.

Moeini et al., "A current-reference-based selective harmonic current mitigation PWM technique to improve the performance of cascaded h-bridge multilevel active rectifiers," IEEE Transactions on Industrial Electronics, Jan. 2018, pp. 727-737, vol. 65, No. 1.

Moeini et al., "High efficiency, hybrid selective harmonic elimination phase-shift PWM technique for cascaded h-bridge inverters to improve dynamic response and operate in complete normal modulation indices," Applied Power Electronics Conference and Exposition, Mar. 2016, pp. 2019-2026.

Zhao et al., "A four-quadrant modulation technique for cascaded multilevel inverters to extend solution range for selective harmonic elimination/ compensation," Applied Power Electronics Conference and Exposition, Mar. 2016, pp. 3603-3610.

Wang et al., "Investigating the power architectures and circuit topologies for megawatt superfast electric vehicle charging stations with enhanced grid support functionality," IEEE International Electric Vehicle Conference, Mar. 2012, pp. 1-8.

Agelidis et al., "A five-level symmetrically defined selective harmonic elimination PWM strategy: analysis and experimental validation," IEEE Transactions on Power Electronics, Jan. 2008, pp. 19-26, vol. 23, No. 1.

"IEEE Recommended Practice and Requirements for Harmonic Control in Electric Power Systems,"IEEE Std 519TM-2014, Revision of IEEE Std 519-1992, 29 pages, (2014).

Moeini et al., "A Cascaded Hybrid Phase Shift-PWM and Asymmetric Selective Harmonic Mitigation-PWM Modulation Technique for Grid-Tied Converter to Reduce the Switching Frequency and Meet the Grid Current Harmonic Requirement," IEEE Applied Power Electronics Conference and Exposition (APEC), pp. 3486-3493, (2017).

Moeini et al., "Improve Control to Output Dynamic Response and Extend Modulation Index Range With Hybrid Selective Harmonic Current Mitigation-PWM and Phase-Shift PWM for Four-Quadrant Cascaded H-Bridge Converters," IEEE Transactions on Industrial Electronics, 64(9):6854-6863, (2017).

United States Patent and Trademark Office, NonFinal Office Action for U.S. Appl. No. 16/270,180, dated Aug. 5, 2019, (15 pages), USA.

\* cited by examiner

CONTROL TO OUTPUT DYNAMIC RESPONSE AND EXTEND MODULATION INDEX RANGE WITH HYBRID SELECTIVE HARMONIC CURRENT MITIGATION-PWM AND PHASE-SHIFT PWM FOR FOUR-QUADRANT CASCADED H-BRIDGE CONVERTERS

CROSS-REFERENCE TO RELATED APPLICATION

This application claims the benefit of U.S. Provisional Patent Application Ser. No. 62/454,997, filed Feb. 6, 2017, which is incorporated herein by reference in its entirety, including any figures, tables, and drawings.

GOVERNMENT SUPPORT

This invention was made with government support under grant number 1540118 awarded by the National Science Foundation. The government has certain rights in the invention.

BACKGROUND

Multilevel power converters have drawn a lot of attention recently [1], [2]. The modulation technique used in multilevel converters must have high efficiency, reduced passive filter cost, and fast transient response under different dynamic conditions [2], [3]. High efficiency is a critical metric for multilevel converters. Because low switching frequencies lead to low switching power losses, low switching frequency modulation techniques such as selective harmonic elimination-PWM (SHE-PWM) [4], selective harmonic mitigation-PWM (SHM-PWM) [5], and selective harmonic current mitigation-PWM (SHCM-PWM) [6] are promising to increase converter efficiencies. In conventional SHE-PWM or SHM-PWM techniques, only the low order harmonics are eliminated or mitigated to meet voltage harmonic limits [3]. Hence, the conventional SHE-PWM and SHM-PWM techniques cannot ensure that current harmonic limits are met, and these limits are more important than the voltage harmonic limits for the grid tied converters [6]. In addition, the grid voltage harmonics can lead to unmitigated current harmonics for SHE-PWM and SHM-PWM techniques, but this information is not included in the equations of these modulation techniques.

These two problems can be considered by introducing a SHCM-PWM technique [6] that can meet the current harmonic limits of IEEE-519 [11] by including the effects of the grid voltage harmonics in the optimization process. In this technique, the coupling inductance between the converter and the grid can be significantly reduced in comparison to SHE-PWM and SHM-PWM techniques [6]. Moreover, a higher number of current harmonics than SHE-PWM and SHM-PWM techniques can be mitigated with the same number of switching transitions [6]. In He et al. [3], based on the dynamic equations of the grid-tied converters, a high performance dynamic response can be achieved for a four-quadrant grid-tied converter. In addition, an indirect controller is used to change the active and reactive currents four times in each fundamental cycle. The modulation technique used in He et al. is phase-shift PWM (PSPWM), which uses a high switching frequency to control low order harmonics. It is important to note that the SHCM-PWM technique could not be used with the indirect controller technique to obtain high dynamic performance. Because SHCM-PWM is an offline modulation technique and the switching angles are calculated and stored in look-up tables, it needs to use fast Fourier transform (FFT), which results in time delays, to apply switching angles to the converters. In addition, the number of switching transitions is very low in SHCM-PWM, so it results in high ripple currents. As a result, it can cause intrinsic weak dynamic performance [7]. When active or reactive power are controlled with SHCM-PWM in four-quadrant converters, because the switching angles need one fundamental cycle to get updated [7], a DC offset remains on the injected currents for several cycles under dynamic conditions [3].

BRIEF SUMMARY

Embodiments of the subject invention provide novel and advantageous hybrid Cascaded H-Bridge (CHB) converters that selectively use a selective harmonic current mitigation pulse width modulation (SHCM-PWM) unit and a phase shift pulse width modulation (PSPWM) unit.

In an embodiment, a hybrid CHB converter can include a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, and a CHB converter selectively coupled to the SHCM-PWM and the PSPWM.

In another embodiment, a hybrid CHB converter can include a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, a modulation selector coupled to the output signal $SW_{SHCM}$ of the SHCM-PWM unit and the output signal $SW_{PS}$ of the PSPWM unit and providing an output signal SW, and a CHB converter coupled to the output signal SW of the modulation selector.

In yet another embodiment, a four-quadrant CHB converter can include a selective harmonic current mitigation pulse width modulation (SHCM-PWM) unit receiving an active power and a reactive power from a power grid, a phase shift pulse width modulation (PSPWM) unit receiving the active power and the reactive power from the power grid, and a CHB converter selectively coupled to the SHCM-PWM unit at steady state and the PSPWM unit at transient state.

DETAILED DESCRIPTION

Figure 1:
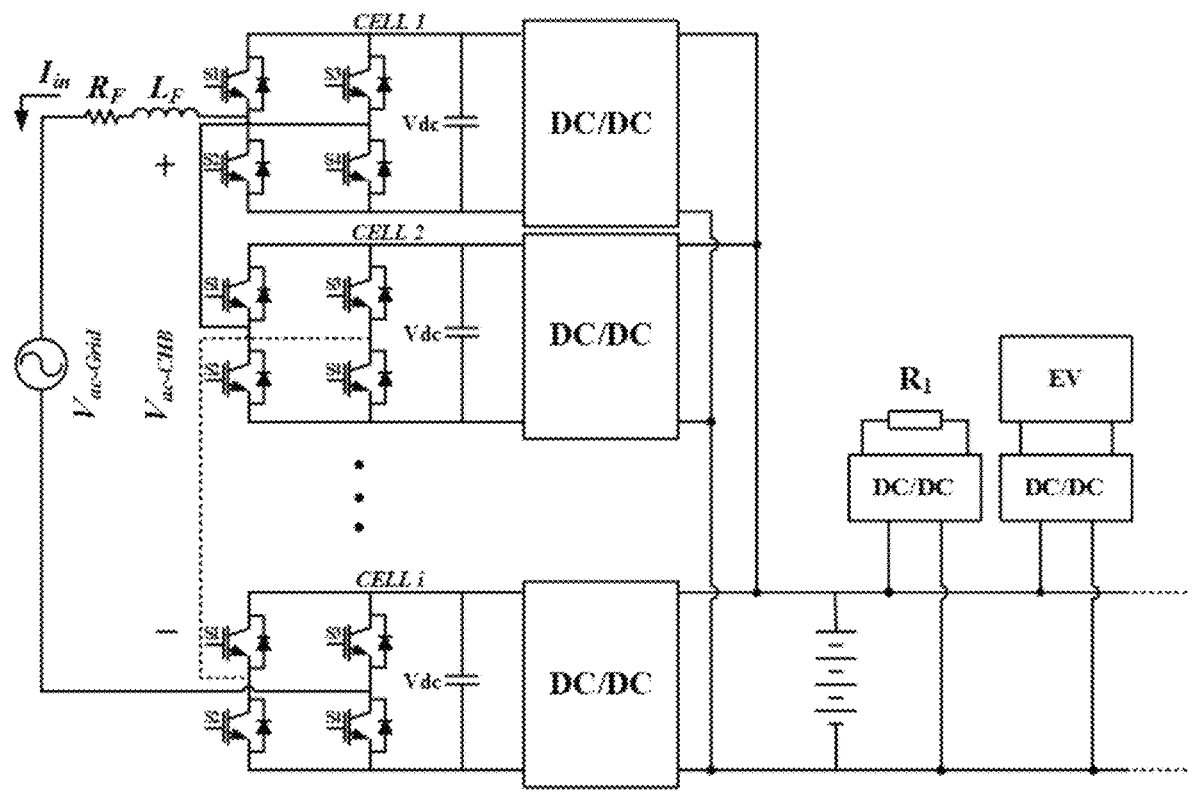
FIG. 1 shows a configuration of a four-quadrant grid-tied Cascaded H-Bridge (CHB) converter.

Embodiments of the subject invention provide novel and advantageous hybrid Cascaded H-Bridge (CHB) converters that selectively use a selective harmonic current mitigation pulse width modulation (SHCM-PWM) unit under steady state and a phase shift pulse width modulation (PSPWM) unit under transient state.

The SHCM-PWM technique can be used in cascaded multilevel converters to extend the harmonic reduction spectrum, reduce the coupling inductance and increase the efficiency. The offline SHCM-PWM technique has a low number of switching transitions, as its switching angles can only change once in a fundamental cycle, and relatively long time delays because it uses fast Fourier transform (FFT). As a result, its dynamic response leaves much to be desired. For the four-quadrant power converters to have good transient dynamic response, both active and reactive power must be controlled at least two times in a fundamental cycle. Thus, embodiments of the subject invention can use a hybrid modulation technique including SHCM-PWM under steady state and PSPWM under transient state. In addition, in order to extend the modulation index range and ensure that SHCM-PWM can process four-quadrant active and reactive power, the constraints of the switching angles for the SHCM-PWM can be modified.

A hybrid modulation technique of an embodiment of the subject invention, which combines a SHCM-PWM technique and a PSPWM technique, is able to achieve high dynamic performance for four-quadrant grid-tied converters. Under steady state condition, the SHCM-PWM technique is applied to achieve high efficiency. Under dynamic condition, the PSPWM technique is employed to update switching transitions several times in each fundamental cycle to achieve high dynamic response performance. Furthermore, a controller is designed to switch between these two modulations. In order to process four-quadrant active and reactive power, the modulation index range of the SHCM-PWM can be greatly extended by modifying the constraints of switching angles. The lowest number of switching transitions for the PSPWM technique is derived so that it does not reduce efficiency and the performance of the indirect controller.

Embodiments of the subject invention can be applied to grid-tied converters. Also, embodiments of the subject invention can be used for renewable energy sources, such as solar panels, to increase the efficiency and improve the dynamic performance. Moreover, embodiments of the subject invention can be used in ultra-fast charging stations of electrical vehicles to inject active and reactive powers to the grid.

In conventional selective harmonic elimination-PWM (SHE-PWM) or SHM-PWM techniques, only the low order harmonics are eliminated or mitigated to meet voltage harmonic limits. The conventional SHE-PWM and SHM-PWM techniques cannot ensure that the current harmonic limits are met, and these limits are more important than the voltage harmonic limits for the grid tied converters. In addition, the grid voltage harmonics can lead to unmitigated current harmonics for SHE-PWM and SHM-PWM techniques, but this information is not included in the equations of these modulation techniques. These two problems can be solved by introducing a SHCM-PWM technique. Hybrid modulation techniques of embodiments of the subject invention are able to achieve high dynamic performance for four-quadrant grid-tied converters by combining a SHCM-PWM technique and a PSPWM technique. Under steady state condition, the SHCM-PWM technique is applied in order to achieve high efficiency, and under dynamic condition, the PSPWM technique is applied to update switching transitions several times in each fundamental cycle to achieve high dynamic response performance. Further, a controller can be provided to switch between these two modulations. In order to process four-quadrant active and reactive power, the modulation index range of SHCM-PWM can be greatly extended by modifying the constraints of switching angles. The lowest number of switching transitions for PSPWM technique is derived so that it does not reduce efficiency and the performance of the indirect controller.

Grid-tied four-quadrant converters need large modulation index range to work with different active and reactive loads [8]. The modulation index range of low frequency modulation techniques depends on optimization constraints applied to the Fourier series equations. To increase modulation index range of low frequency modulation techniques, either an unequal DC link voltage technique [9] or modified switching angle constraints [8] can be used.

However, a hybrid modulation technique of an embodiment of the subject invention, which combines SHCM-PWM and PSPWM, achieves high dynamic performance for four-quadrant grid-tied converters, because the SHCM-PWM technique is applied under steady state to achieve high efficiency and the PSPWM technique is applied under dynamic condition to update switching transitions several times in each fundamental cycle to achieve high dynamic response performance. Further, a controller can be designed to selectively switch between these two modulations.

FIG. 1 shows a configuration of a four-quadrant CHB grid-tied converter. Referring to FIG. 1, the CHB converter is connected to a power grid with coupling inductance $L_F$ and parasitic resistance $R_F$. The CHB converter includes i number of cells. The DC link voltages are equal to $V_{dc}$, and the DC side of each cell is directly connected to the isolated DC/DC converters. The outputs of isolated DC/DC converters are in parallel to charge energy storage on a DC bus. The loads can be connected to the DC bus with bi-directional DC/DC converters in FIG. 1. Because DC link voltages of the CHB converter can be regulated with the isolated DC/DC converters [10], the DC links of embodiments of the subject invention can be connected to DC sources. The time domain current equation of the CHB converter on AC side is, $$v_{ac-CHB-h(t)} = L_F \frac{di_{in-h}(t)}{dt} + R_F i_{in-h}(t) + v_{ac-Grid-h}(t), \quad (1)$$

Figure 2:
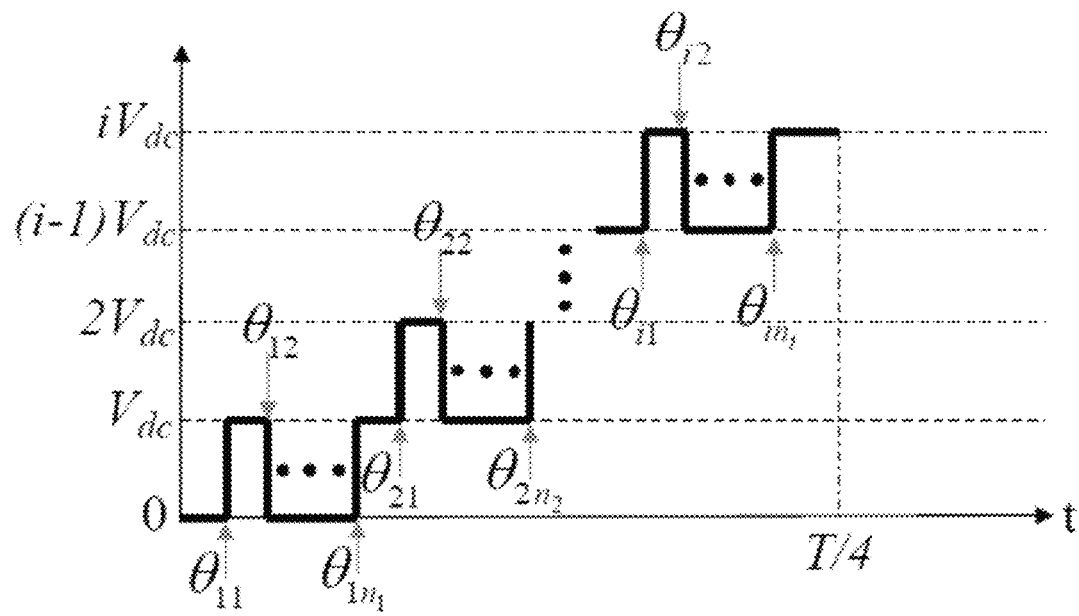
FIG. 2 shows a voltage waveform of an i-cell of a selective harmonic current mitigation pulse width modulation (SHCM-PWM) converter.

In equation (1), $v_{ac-Grid-h}$, $v_{ac-CHB-h}$, and $i_{in-h}$ are the $h^{th}$ harmonic order of the grid voltage, CHB voltage, and injected current, respectively. The relationship of fundamental frequency (60/50 Hz) component $v_{ac-Grid-1}$, $v_{ac-CHB-1}$, and $i_{in-1}$ can be obtained in equation (1). The quarter period waveform of $v_{ac-CHB-h}$ for the i-cell CHB converter in FIG. 1, when $j^{th}$ cell has $n_j$ (j=1, 2 ..., i) switching angles in each quarter period, is shown in FIG. 2. FIG. 2 shows a voltage waveform of an i-cell of a SHCM-PWM converter. Due to quarter wave symmetry, the Fourier series equations of FIG. 2 can be written as, $$v_{ac-CHB}(t) = \sum_{h=1}^{\infty} \frac{4V_{dc}}{\pi h} b_h \sin(h\omega t), \quad (2)$$

$$b_h = (\cos(h\theta_{11}) - \cos h\theta_{12}) + \ldots + \cos(h\theta_{i(n_i)})),$$

where $\theta_{11}, \theta_{12}, \ldots, \theta_{i(n_i)}$ are the switching angles of the CHB converter in each quarter period as shown in FIG. 2. $4V_{dc} b_h/(\pi h)$ is the magnitude of the $h^{th}$ order harmonic for $v_{ac-CHB}(t)$. When h=1, the modulation index ($M_a = b_1$) of the CHB converter is obtained from equation (2).

The power quality standard that is used to meet both current and voltage harmonics is IEEE 519 [11]. The limits of both current and voltage harmonics at the point of common coupling (PCC) are provided in Table I below. In IEEE-519, $I_L$, is the maximum demand load current of the four-quadrant converter. $I_{sc}$ is the short circuit current at the PCC.

TABLE I

CURRENT AND VOLTAGE HARMONIC LIMITS OF IEEE 519 STANDARD ($I_{SC}/I_L$ ≤ 20) [11] FOR GRID VOLTAGE LESS THAN 69 KV.

| Harmonic order (h) | Current harmonics and total demand distortion TDD | Voltage harmonics and total harmonic distortion THD |
|---|---|---|
| 3 ≤ h < 11 | 4% | 3% |
| 11 ≤ h < 17 | 2% | 3% |
| 17 ≤ h < 23 | 1.5% | 3% |
| 23 ≤ h < 35 | 0.6% | 3% |
| 35 ≤ h | 0.3% | 3% |
| TDD or THD | 5% | 5% |

The key parameters, such as the switching frequency of each switch, the number of harmonics that can be mitigated with the SHCM-PWM, and the coupling inductance between the converter and the grid, can be considered. When the grid voltage harmonics ($|V_{ac-Grid-h}|$) have the highest magnitudes under the worst scenario defined in Table I, the equation set that is used to find the solutions of SHCM-PWM to meet current harmonic limits of IEEE 519 in Table I is shown below, $$\begin{cases} M_a = \cos\theta_{11} - \cos\theta_{12} + \cos\theta_{13} + \ldots + \cos\theta_K, \\ \frac{|V_{ac-Grid-h}| + |V_{ac-CHB-h}|}{|\omega h L_T I_L|} \leq C_h, \, h = 3, 5, 7 \ldots \\ \sqrt{\left(\frac{I_{in-3}}{I_L}\right)^2 + \left(\frac{I_{in-5}}{I_L}\right)^2 + \ldots + \left(\frac{I_{in-h}}{I_L}\right)^2} \leq C_{TDD}, \end{cases} \quad (3)$$

where K is the number of switching transitions of the SHCM-PWM during a quarter fundamental period (K=$n_{11}$+ $n_{12}$+ ... $n_{i(ni)}$), and $C_h$ and $C_{TDD}$ are the current harmonics and TDD limits of $i_{in}$ in Table I. By using guidelines in Moeini et al. [6], which is hereby incorporated by reference herein in its entirety, the parameters can be calculated as shown in Table II.

TABLE II

CALCULATED CIRCUIT PARAMETERS OF SHCM-PWM TECHNIQUE

| Parameter | Symbol | Value |
|---|---|---|
| Line frequency | F | 60 Hz |
| AC grid Voltage (RMS) | $V_{ac-Grid}$ | 110 V |
| Total rated power | $S_{total}$ | 1.5 kVA |
| Maximum Demand Load (RMS) | $I_L$ | 14.14 A |
| Number of H-bridge cells | i | 3 |
| Number of switching transitions | K | 9 |
| Highest order of mitigated harmonic in (3) | H | $69^{th}$ |
| DC bus voltage | $V_{dc}$ | 73 V |
| Coupling inductance | $L_F$ | 10 mH (0.485 p.u.) |
| Parasitic resistance of $L_F$ | $R_F$ | 0.6 Ω |

To ensure that the SHCM-PWM modulation technique can properly work in steady state for four-quadrant active and reactive power, the limitations for the maximum and minimum modulation indices can be obtained based on equation (1). In equation (1), the modulation index of CHB voltage is, $$M_a = \left| \frac{\pi}{4V_{dc}} (V_{ac-Grid-1} \angle 0 + (j\omega L_F + R_F) I_{in-1} \angle \theta_{I_{in-1}}) \right| \quad (4)$$

Figure 3:
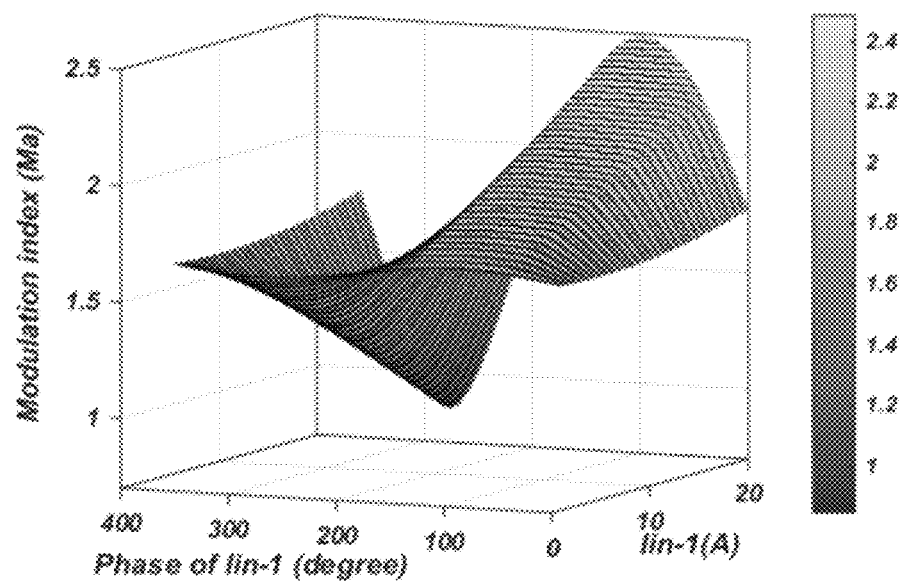
FIG. 3 shows a required modulation index for a four-quadrant CHB converter.

FIG. 3 shows a required modulation index for a four-quadrant CHB converter. In equation (4), if the grid voltage is taken as the reference, by changing the magnitude and phase of $i_{in-1}$ ($0 < I_{in-1} < I_L$, $0 < \theta_{I_{in-1}} < 2\pi$), the required modulation indices are derived as FIG. 3, for the circuit parameters in Table II. Referring to FIG. 3, the CHB converter can process four-quadrant active and reactive power at steady state when modulation index changes from 0.85 to 2.485.

The conventional constraints of the switching angles used to solve switching angles for the equation set in equation (3) are, $$0 < \theta_{11} < \theta_{12} < \ldots < \theta_{in_i} < \frac{\pi}{2} \quad (5)$$

The constraints in equation (5) undesirably restrict the optimization techniques used to solve equation (3). The switching angle solution range of SHCM-PWM technique can be significantly improved by modifying the constraints to, $$0 < \theta_{11} < \frac{\pi}{2}, 0 < \theta_{12} < \frac{\pi}{2}, \ldots, 0 < \theta_{in_i} < \frac{\pi}{2} \quad (6)$$

Figure 4:
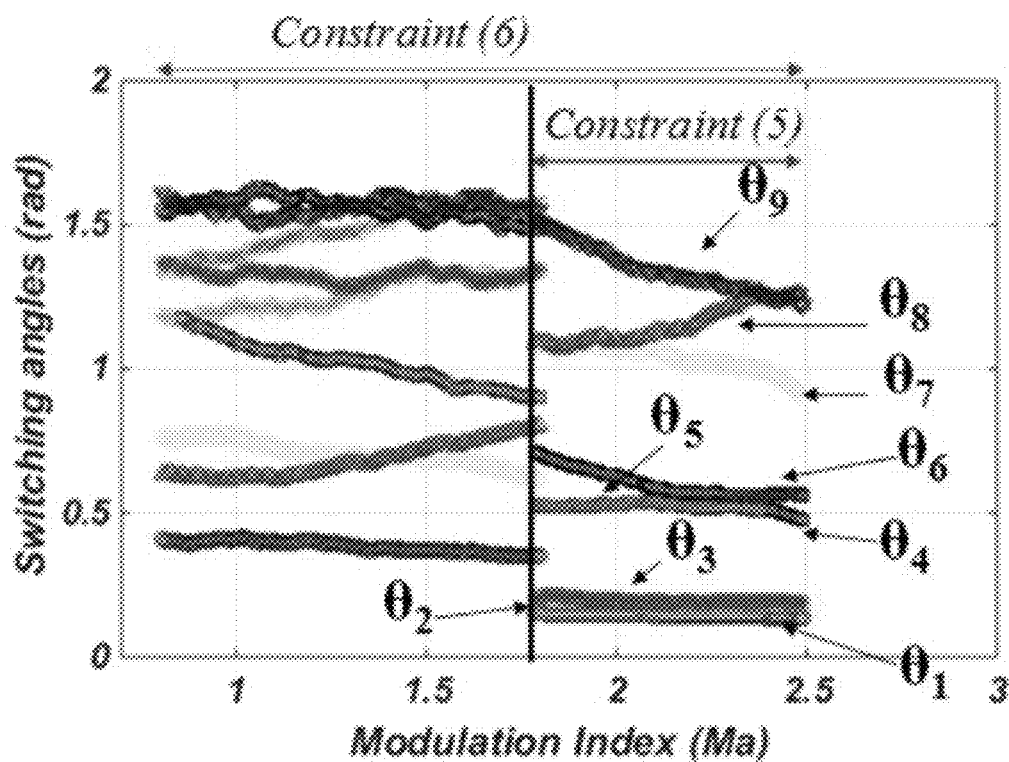
FIG. 4 shows a graph of switching angle solution vs. modulation index with SHCM-PWM technique.

The multi-objective particle swarm optimization (MOPSO) technique, as in Reyes-Sierra et al. [12] (which is hereby incorporated by reference herein in its entirety), can be used to solve equation (3). The modulation index ranges of using the switching angle constraints in equations (5) and (6) for equation (3) are compared in FIG. 4. FIG. 4 shows a graph of switching angle solution vs. modulation index with a SHCM-PWM technique. Referring to FIG. 4, the switching angle solution with conventional constraints in equation (5) limits the modulation index to [1.78, 2.495]. The modulation index is greatly extended to [0.8, 2.495] with the modified switching angle constraints in equation (6); it covers all of the required modulation indices in FIG. 3.

By changing the modulation index, the magnitude of $v_{ac-CHB-1}$ in equation (2) can be controlled. However, in order to track desired active and reactive power for four-quadrant operations, the phase of CHB voltage should also be controlled. Because of this, if the phase of the CHB voltage is $\theta$ and $0 < \theta < 2\pi$, (2) can be rewritten as, $$v_{ac-CHB}(t) = \sum_{h=1}^{\infty} \frac{4V_{dc}}{\pi h} b_h \sin(h\omega t + h\theta) \quad (7)$$

or, $$v_{ac-CHB}(t) = \sum_{h=1}^{\infty} \frac{4V_{dc}}{\pi h} b_h (\cos(h\theta)\sin(h\omega t) + \sin(h\theta)\cos(h\omega t)) \quad (8)$$

Because when the phases of both $I_{in-1}$ and $V_{ac-CHB}$ change from 0 to $2\pi$, there are switching angle solutions, the CHB can handle four-quadrant active and reactive power.

Figure 5:
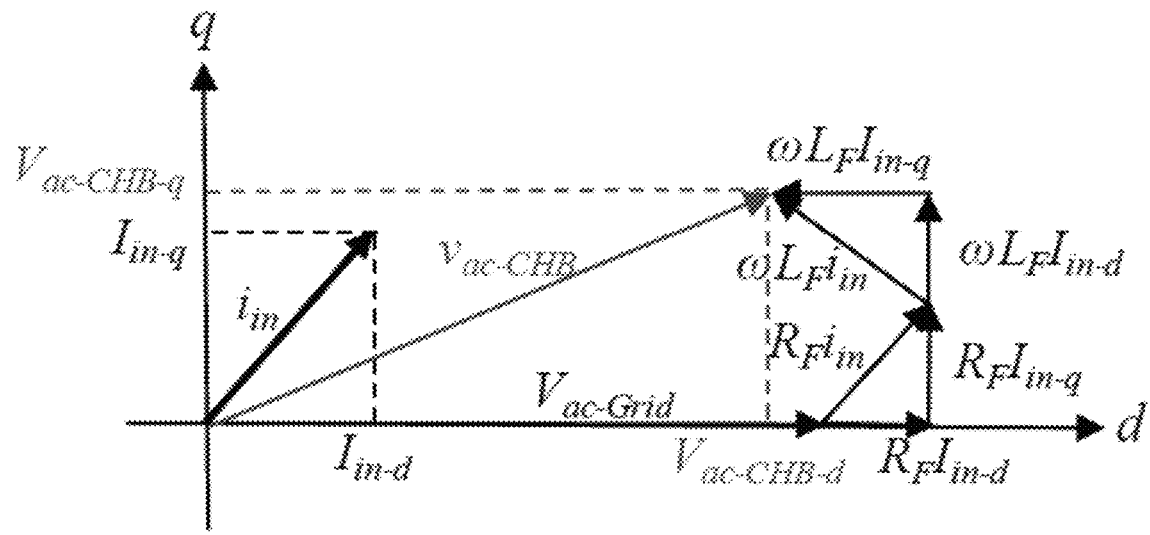
FIG. 5 shows a phase diagram of a grid-tied converter.

FIG. 5 shows a phase diagram of a grid-tied converter. The dq phasor diagram of equation (1) for the fundamental frequency is shown in FIG. 5.

The dq frame rotates counterclockwise with speed ω. The injected current $i_{in}(t)$ is composed of dq components as, $$i_{in}(t) = I_{in-d} \sin(\omega t) + I_{in-q} \cos(\omega t) \quad (9)$$

From FIG. 5, the CHB voltage is, $$v_{ac-CHB}(t) = V_{ac-CHB-d} \sin(\omega t) + V_{ac-CHB-q} \cos(\omega t),$$

$$V_{ac-CHB-d} = -L_F \omega I_{in-q} + R_F I_{in-d} + V_{ac-Grid}, \quad (10)$$

In order to have the desired current in FIG. 5, the CHB voltage can be controlled with $b_1$ and $\theta$ in equation (8) by using the following equations, $$V_{ac-CHB-d} = \frac{4V_{dc}b_1}{\pi} \cos(\theta), \quad (11)$$

$$V_{ac-CHB-q} = \frac{4V_{dc}b_1}{\pi} \sin(\theta).$$

In the time domain, if the changes of dq current references cause $v_{ac\_CHB}(t)$ to change by $\Delta_{vac-CHB}(t)$ from $v_{ac\_CHB1}(t)$ to $v_{ac\_CHB2}(t)$, and $i_{in}(t)$ to change by $\Delta i_{in}(t)$ from $i_{in1}(t)$ to $i_{in2}(t)$, the following equations hold, $$i_{in2}(t) = i_{in1}(t) + \Delta i_{in}(t),$$

$$v_{ac-CHB2}(t) = v_{ac-CHB1}(t) + \Delta v_{ac-CHB}(t), \quad (12)$$

It is assumed that the grid voltage does not change under the transient condition so $\Delta_{vac-Grid} = 0$. Based on FIG. 5, $\Delta_{in}$ and $\Delta_{vac-CHB}$ can be derived as, $$\Delta V_{ac-CHB-d} = -L_F \omega \Delta I_{in-q} + R_F \Delta I_{in-d},$$

$$\Delta V_{ac-CHB-q} = L_F \omega \Delta I_{in-d} + R_F \Delta I_{in-q},$$

$$\Delta v_{ac-CHB}(t) = \Delta V_{ac-CHB-d} \sin(\omega t) + \Delta V_{ac-CHB-q} \cos(\omega t)$$

$$\Delta i_{in}(t) = \Delta I_{in-d} \sin(\omega t) + \Delta I_{in-q} \cos(\omega t) \quad (13)$$

The differential equation under transient duration is, $$\Delta v_{ac-CHB}(t) = L_F \frac{d\Delta i_{in}(t)}{dt} + R_F \Delta i_{in}(t) \quad (14)$$

If the current changes at $t=t_0$, from equations (13) and (14), the $\Delta_{in}$ can be solved as, $$\Delta i_{in}(t) = c e^{\frac{-R_F}{L_F}t} + (\Delta I_{in-d} \sin(\omega t) + \Delta I_{in-q} \cos(\omega t)) \quad (15)$$

where c depends on both $\Delta v_{ac-CHB}$ and the initial condition of $\Delta i_{in}$. If the control signal of $\Delta I_{in-d}$ and $\Delta_{in-q}$ change at $t=t_0$ and $\Delta_{in}(t0-)=0$, c can be derived as, $$c = -e^{\frac{R_F}{L_F}t_0} (\Delta I_{in-d} \sin(\omega t_0) + \Delta I_{in-q} \cos(\omega t_0)) \quad (16)$$

The second term in equation (15) is the steady state term of $\Delta i_{in}$. The first term in equation (15) is an undesirable transient current. In order to remove undesirable transient current, in equation (16), c should be always equal to zero. Because of this, $\Delta_{in-d}$ or $\Delta_{in-q}$ should only change when $\sin(\omega t_0)$ or $\cos(\omega t_0)$ are equal to zero. This indicates if dq currents in equation (16) change under the following conditions, $i_{in}$ will have no transient currents.

$$\begin{cases} \omega t_0 = k\pi, & \Delta I_{in-d} \text{ should change} \\ \omega t_0 = k\pi + \dfrac{\pi}{2}, & \Delta I_{in-q} \text{ should change} \end{cases} \quad (17)$$

To have the fast transient response in practice, the active power, which is determined by $\Delta_{in-d}$, and reactive power, which is determined by $\Delta_{in-q}$, must change at times defined in equation (17). Therefore, the currents can have 2 to 4 changes within one cycle. At the same time, the existing technique uses only the PSPWM technique to improve the transient condition. However, the mitigation of low order current harmonics using the PSPWM technique needs more switching transitions than low frequency modulation techniques such as SHE-PWM. As a result, the PSPWM technique has a high switching power loss. Hybrid SHCM-PWM and PSPWM techniques of embodiments of the subject invention solve these issues. In embodiments of the subject invention, the SHCM-PWM technique is employed under the steady state condition and the PSPWM technique is employed under the transient condition.

Figure 6:
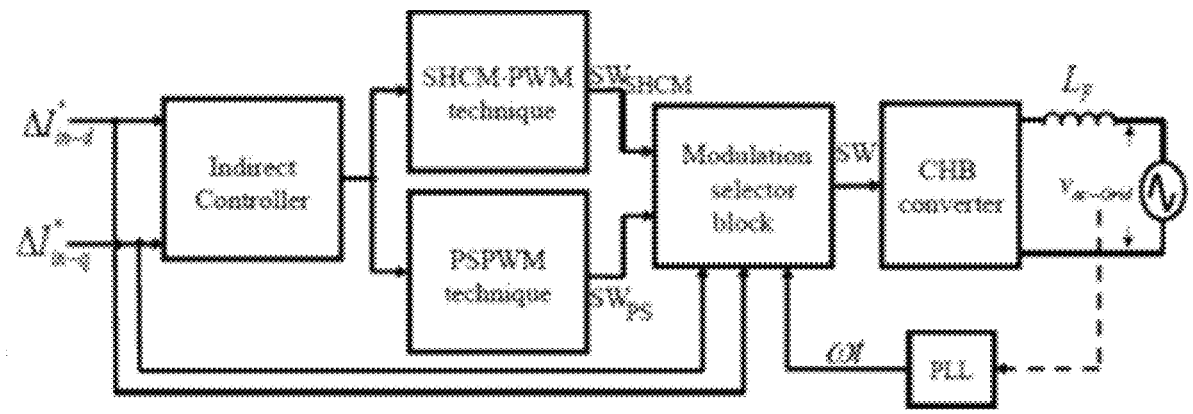
FIG. 6 shows a hybrid CHB converter according to an embodiment of the subject invention.

FIG. 6 shows a hybrid CHB converter according to an embodiment of the subject invention. The block diagram in FIG. 6 shows the hybrid SHCM-PWM and PSPWM technique. In this embodiment, when current references $\Delta I^*_{in-d}$ and $\Delta I^*_{in-q}$ change, the following conditions must be used by the modulation selector to select the modulation technique for the CHB converter, a) If $|\Delta I^*\text{in-d}|>0$ & $\omega t=k\pi$, use PSPWM (SW$_{PS}$) until $\omega t=(k+2)\pi$ b) If $|\Delta I^*\text{in-q}|>0$ & $\omega t=k\pi+\pi/2$, use PSPWM (SW$_{PS}$) until $\omega t=(k+2)\pi$ c) Otherwise, use SHCM-PWM.

Figure 7:
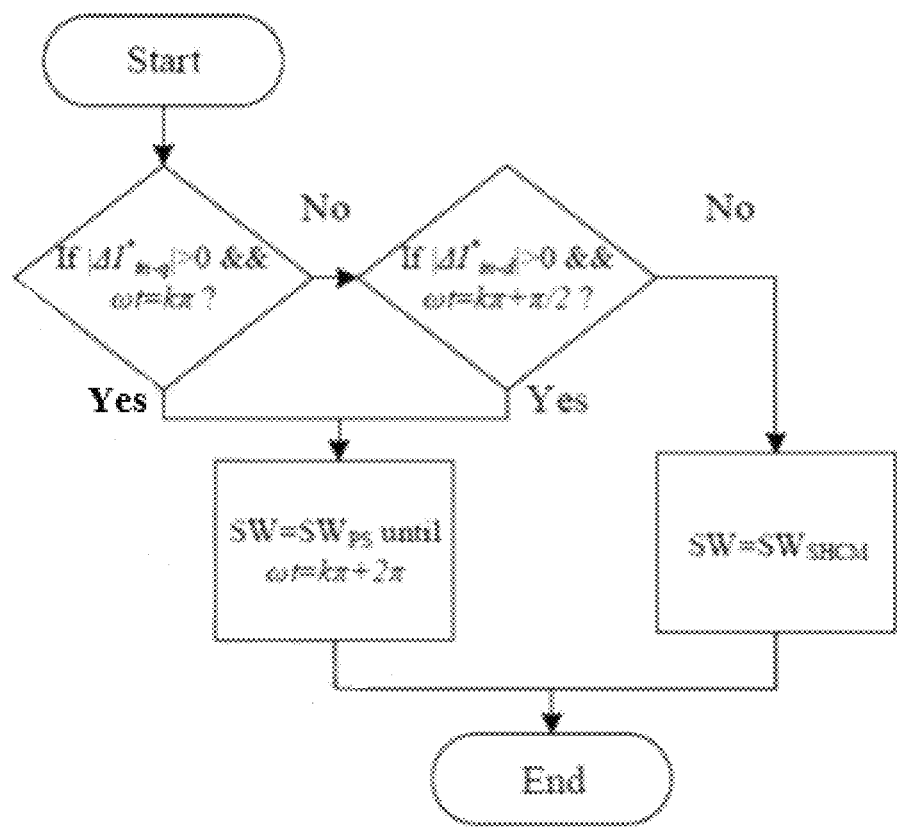
FIG. 7 shows a flowchart of a modulation selector block according to an embodiment of the subject invention.
Figure 8:
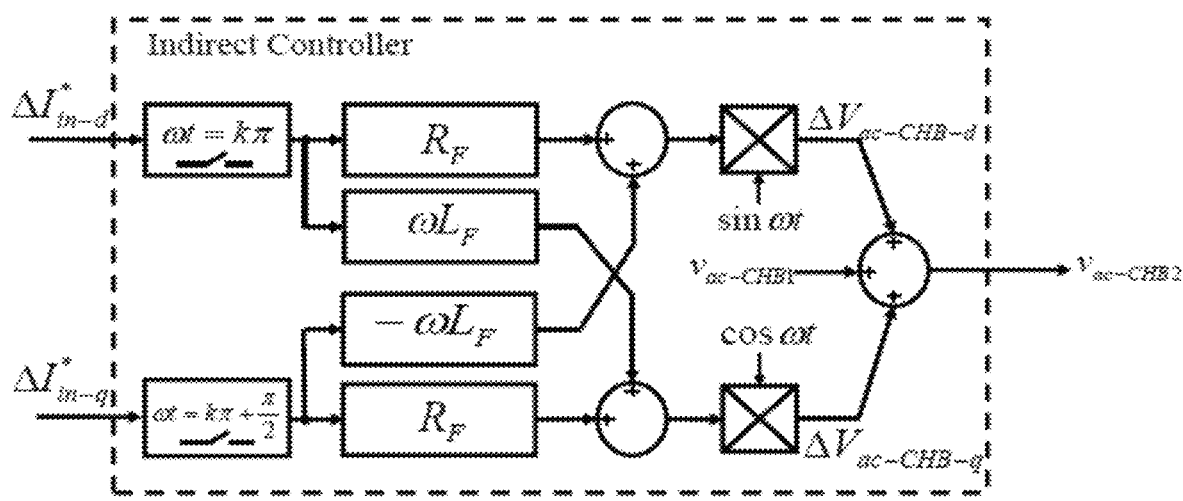
FIG. 8 shows an indirect controller generating $v_{ac\text{-}CHB}$.

FIG. 7 shows a flowchart of a modulation selector block according to an embodiment of the subject invention, and FIG. 8 shows an indirect controller generating $v_{ac-CHB}$. The flowchart for the modulation selector block in FIG. 6 is shown in FIG. 7. The block diagram of the indirect controller based on equations (12), (13), and (17) is shown in FIG. 8. The output of the indirect controller in FIG. 8 is $v_{ac-CHB2}$. Because the PSPWM technique does not use FFT to change $v_{ac-CHB}$, it is possible to change $v_{ac-CHB}$ several times in a fundamental period. On the other hand, the SHCM-PWM technique needs to use the FFT block to obtain the modulation index $M_a$, which is needed for checking look up tables and changing the output voltage of the CHB converter. Because the FFT block has time delays, the SHCM-PWM technique needs at least one cycle to change $v_{ac-CHB}$. However, equation (17) requires changing the $v_{ac-CHB}$ at least twice in a fundamental period so both active and reactive power can be controlled for a four-quadrant grid-tied converter. Therefore, the PSPWM technique is an appropriate technique for dynamic response improvement.

Figure 9:
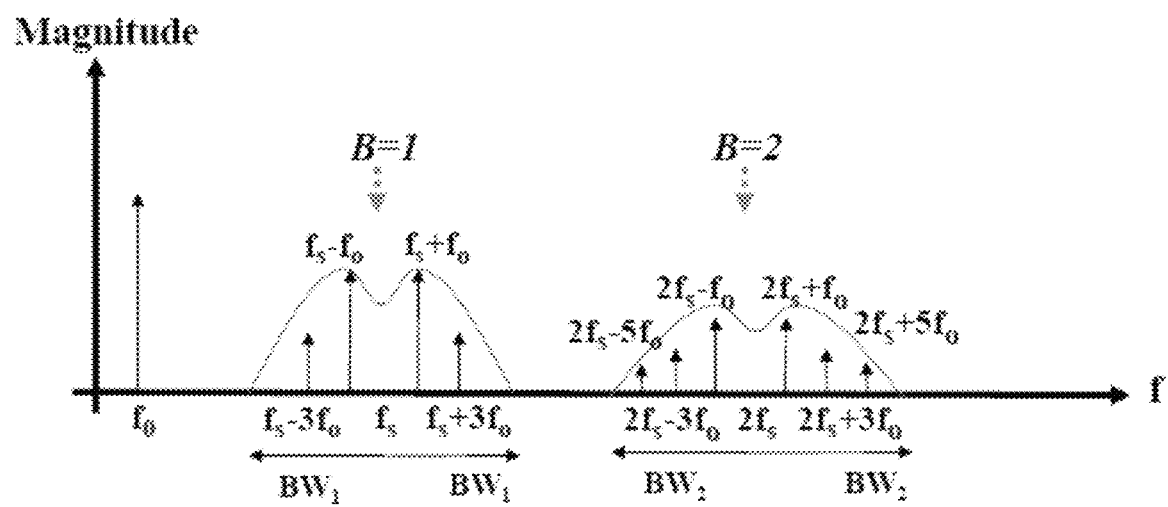
FIG. 9 shows a harmonic spectrum of the $v_{ac\text{-}CHB}$ with a phase shift pulse width modulation (PSPWM) technique.

The switching frequency of the PSPWM technique must be designed to have both good dynamic response and low switching power loss. To reduce the switching power loss, the switching frequency of PSPWM must be chosen as low as possible when the dynamic response is greatly improved. However, reducing the switching frequency of PSPWM may lead to undesirably-high low-order voltage harmonics, which includes the fundamental $v_{ac-CHB-1}$. Because of this, the lowest PSPWM switching frequency, which does not affect $v_{ac\ CHB-1}$, can be explored. The output voltage of an i-cell CHB converter with the PSPWM technique can be written as, $$v_{ac-CHB-PSPWM}(t) = \qquad (18)$$

$$iV_{dc}M\cos(\omega_0 t + \theta_0) + \dfrac{4V_{dc}}{\pi}\sum_{B=1}^{\infty}\sum_{A=-\infty}^{\infty}\left(\dfrac{1}{2B}J_{2A-1}(iB\pi M)\times \right.$$

$$\left.\sin\!\left((2iB+2A-1)\dfrac{\pi}{2}\right)\cos(2iB\omega_c t+(2A-1)(\omega_0 t+\theta_0))\right)$$

where, $\omega_0=2\pi f_0$, $f_0$ and $\theta_0$ are the fundamental frequency and phase of CHB voltage. M is the modulation index of each cell of CHB. The total modulation index $M_a$ of the CHB converter is iM. $\omega_c=2\pi f_c$ and $f_c$ is the average carrier frequency of each cell. B is the baseband, and A is the sideband harmonics of each baseband harmonic as shown in FIG. 9. FIG. 9 shows the harmonic spectrum of the $v_{ac-CHB}$ with PSPWM technique. J is the Bessel function of first kind. The bandwidth of B$^{th}$ baseband harmonic in FIG. 9 can be obtained with the following equation, $$BW_B \approx 2(iMB\pi+2)f_0 \qquad (19)$$

In equation (18), the switching frequency fs of the $v_{ac-CHB}$ with PSPWM is equal to $2if_c$. In order not to generate sideband harmonics overlapping and influencing $v_{ac-CHB-1}$, the carrier frequency of the CHB converter for the first baseband (B=1) can be derived based on following equation, $$f_s-BW_1>f_0 \Rightarrow f_s>f_0+BW_1 \Rightarrow f_s>(2iMB\pi+5)f_0 \qquad (20)$$

Based on equation (20), when 1=3, M=1 (the maximum modulation index for each cell) and in the worst scenario, the lowest $f_s$ and $f_c$ are therefore 1440 Hz and 240 Hz respectively.

The subject invention includes, but is not limited to, the following exemplified embodiments.

Embodiment 1

A hybrid Cascaded H-Bridge (CHB) converter, comprising:

a selective harmonic current mitigation pulse width modulation (SHCM-PWM) unit coupled to an input current and providing an output signal SW$_{SHCM}$;

a phase shift pulse width modulation (PSPWM) unit coupled to the input current and providing an output signal SW$_{PS}$; and a CHB converter selectively coupled to the SHCM-PWM unit and the PSPWM unit.

Embodiment 2

The hybrid CHB converter according to embodiment 1, wherein the CHB converter is coupled to the SHCM-PWM unit under steady state condition and the CHB converter is coupled to the PSPWM unit under dynamic condition.

Embodiment 3

The hybrid CHB converter according to embodiment 2, wherein the CHB converter is coupled to the PSPWM unit under transient condition.

Embodiment 4

The hybrid CHB converter according to any of embodiments 2-3, wherein the input current includes an active current reference $\Delta I^*_{in-d}$ and a reactive current reference $\Delta I^*_{in-q}$, and the CHB converter is selectively coupled to the SHCM-PWM unit and the PSPWM unit based on the active current reference $\Delta I^*_{in-d}$ and the reactive current reference $\Delta I^*_{in-q}$.

Embodiment 5

The hybrid CHB converter according to embodiment 4, wherein the CHB converter is selectively coupled to the PSPWM unit in case the input current satisfies the following Formula 1:

$$|\Delta I^*_{in-d}|>0 \ \& \ \omega t=k\pi, \text{ until } \omega t=(k+2)\pi \quad \text{Formula 1}$$

Embodiment 6

The hybrid CHB converter according to embodiment 5, wherein the CHB converter is selectively coupled to the PSPWM unit in case the input current satisfies the following Formula 2:

$$|\Delta I^*_{in-q}|>0 \ \& \ \omega t=k\pi+\pi/2, \text{ until } \omega t=(k+2)\pi. \quad \text{Formula 2}$$

Embodiment 7

The hybrid CHB converter according to embodiment 6, wherein the CHB converter is selectively coupled to the SHCM-PWM unit in all cases where the input current does not satisfy either of Formula 1 and Formula 2.

Embodiment 8

The hybrid CHB converter according to any of embodiments 2-7, further comprising an indirect controller coupled to the input current and providing an output current $v_{ac-CHB2}$ to the SHCM-PWM unit and the PSPWM unit.

Embodiment 9

A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW; and
a CHB converter coupled to the output signal SW of the modulation selector.

Embodiment 10

The hybrid CHB converter according to embodiment 9, wherein the modulation selector is connected to the input current.

Embodiment 11

The hybrid CHB converter according to embodiment 10, wherein the modulation selector selects one of the output signal $SW_{SHCM}$ and the output signal $SW_{PS}$ as the output signal SW based on the input current.

Embodiment 12

The hybrid CHB converter according to embodiment 11, further comprising an indirect controller coupled to the input current and providing an output current $v_{ac-CHB2}$ to the SHCM-PWM unit and the PSPWM unit.

Embodiment 13

The hybrid CHB converter according to embodiment 12, wherein the input current includes an active current reference $\Delta I^*_{in-d}$ and a reactive current reference $\Delta I^*_{in-q}$, and the modulation selector selects one of the output signal $SW_{SHCM}$ and the output signal $SW_{PS}$ based on the active current reference $\Delta I^*_{in-d}$ and the reactive current reference $\Delta I^*_{in-q}$.

Embodiment 14

The hybrid CHB converter according to embodiment 13, wherein the modulation selector selects the output signal $SW_{PS}$ in case the input current satisfies the following Formulas 3 and 4:

$$|\Delta I^*_{in-d}|>0 \ \& \ \omega t=k\pi, \text{ until } \omega t=(k+2)\pi, \quad \text{Formula 3}$$

$$|\Delta I^*_{in-q}|>0 \ \& \ \omega t=k\pi+\pi/2, \text{ until } \omega t=(k+2)\pi. \quad \text{Formula 4}$$

Embodiment 15

The hybrid CHB converter according to embodiment 14, the modulation selector selects the output signal $SW_{SHCM}$ in all cases where the input current does not satisfy both Formula 3 and Formula 4.

Embodiment 16

The hybrid CHB converter according to any of embodiments 12-15, further comprising a phase lock loop (PLL) coupled to the modulation selector and an output of the CHB converter.

Embodiment 17

The hybrid CHB converter according to any of embodiments 9-16, wherein switch angles of the CHB converter are modified such that each of the switch angles has a range of 0 to $\pi/2$ (alternatively, or in addition, each of the switch angles is in a range of 0 to $\pi/2$).

Embodiment 18

The hybrid CHB converter according to embodiment 17, wherein the switch angles of the CHB are calculated and stored in a look up table.

Embodiment 19

The hybrid CHB converter according to embodiment 18, wherein the SHCM-PWM unit uses a FFT block.

Embodiment 20

The hybrid CHB converter according to embodiment 19, wherein the SHCM-PWM unit obtains a modulation index for checking the look up table.

Embodiment 21

A four-quadrant Cascaded H-Bridge (CHB) converter, comprising:

a selective harmonic current mitigation pulse width modulation (SHCM-PWM) unit receiving an active power and a reactive power from a power grid;

a phase shift pulse width modulation (PSPWM) unit receiving the active power and the reactive power from the power grid; and a CHB converter selectively coupled to the SHCM-PWM unit at steady state and the PSPWM unit at transient state.

Embodiment 22

The four-quadrant CHB converter according to embodiment 21, wherein the active power and the reactive power are changed separately within one cycle.

Embodiment 23

The four-quadrant CHB converter according to any of embodiments 21-22, wherein a switching frequency of the PSPWM unit is 240 Hertz (Hz).

Embodiment 24

The four-quadrant CHB converter according to any of embodiments 21-23, wherein a modulation index with the SHCM-PWM unit is in a range of 0.8 to 2.495.

Embodiment 25

A grid-tied converter, comprising:

a selective harmonic current mitigation pulse width modulation (SHCM-PWM) unit coupled to an input current and providing an output signal $SW_{SHCM}$;

a phase shift pulse width modulation (PSPWM) unit coupled to the input current and providing an output signal $SW_{PS}$;

a modulation selector coupled to the output signal $SW_{SHCM}$ of the SHCM-PWM unit and the output signal $SW_{PS}$ of the PSPWM unit and providing an output signal SW; and a H bridge converter coupled to the output signal SW of the modulation selector.

Embodiment 26

The grid-tied converter according to embodiment 25, wherein the modulation selector is connected to the input current.

Embodiment 27

The grid-tied converter according to any of embodiments 25-26, wherein the modulation selector selects one of the output signal $SW_{SHCM}$ and the output signal $SW_{PS}$ as the output signal SW based on the input current.

Embodiment 28

The grid-tied converter according to any of embodiments 25-27, further comprising an indirect controller coupled to the input current and providing an output current $v_{ac-CHB2}$ to the SHCM-PWM unit and the PSPWM unit.

Embodiment 29

The grid-tied converter according to any of embodiments 25-28, further comprising a phase lock loop (PLL) coupled to the modulation selector and an output of the grid-tied converter.

Embodiment 30

The grid-tied converter according to any of embodiments 25-29, further comprising an inductor connected to the H bridge converter.

Embodiment 31

A motor, comprising:

a selective harmonic current mitigation pulse width modulation (SHCM-PWM) unit coupled to an input current and providing an output signal $SW_{SHCM}$;

a phase shift pulse width modulation (PSPWM) unit coupled to the input current and providing an output signal $SW_{PS}$;

a modulation selector coupled to the output signal $SW_{SHCM}$ of the SHCM-PWM unit and the output signal $SW_{PS}$ of the PSPWM unit and providing an output signal SW;

a H bridge converter coupled to the output signal SW of the modulation selector; and a motor connected to the H bridge converter.

Embodiment 32

The motor according to embodiment 31, wherein the motor is a single phase asynchronous motor or a three phase asynchronous motor.

Embodiment 33

A filter, comprising:

a selective harmonic current mitigation pulse width modulation (SHCM-PWM) unit coupled to an input current and providing an output signal $SW_{SHCM}$;

a phase shift pulse width modulation (PSPWM) unit coupled to the input current and providing an output signal $SW_{PS}$;

a modulation selector coupled to the output signal $SW_{SHCM}$ of the SHCM-PWM unit and the output signal $SW_{PS}$ of the PSPWM unit and providing an output signal SW;

a H bridge converter coupled to the output signal SW of the modulation selector; and a passive filter connected to the H bridge converter.

Embodiment 34

The filter according to embodiment 33, wherein the passive filter includes at least one of an L filter, an LC filter, and an LCL filter.

A greater understanding of the present invention and of its many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

For performance evaluation of the hybrid SHCM-PWM and PSPWM technique, MATLAB Simulink was used for the simulations. The circuit parameters, which were used in both simulation and experimental results, are shown in Table II. The DC voltage of battery for each cell in the simulation and experimental results was 65V. The obtained solutions in FIG. 4 can still be used for $V_{dc}$=65 V because low DC link voltages result in low voltage harmonics in equations (2) and (3).

The purposes of the simulations and experiments were to: (a) validate whether $i_{in}$ can meet the IEEE 519 current harmonic limits with the extended solution range in equation (6); (b) validate whether the hybrid SHCM-PWM and PSPWM technique based on FIG. 6 can achieve high dynamic response and the transient current can be significantly reduced; and (c) validate whether the CHB converter can process four-quadrant active and reactive power. The active and reactive powers can be either injected to or absorbed from the power grid.

Figure 10A:
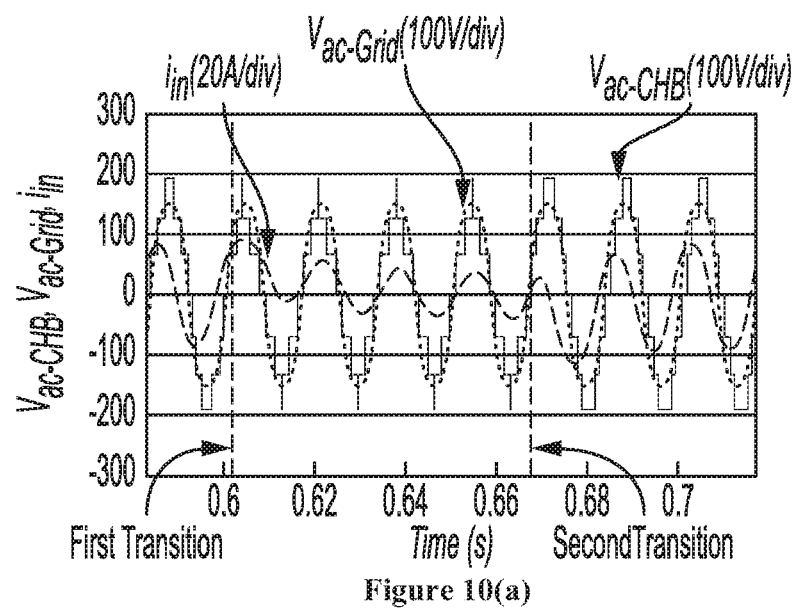
FIG. 10(a) shows a first simulation result of $V_{ac\text{-}CHB}$, $V_{ac\text{-}Grid}$, and $I_{in}$ for a conventional four-quadrant converter.
Figure 10B:
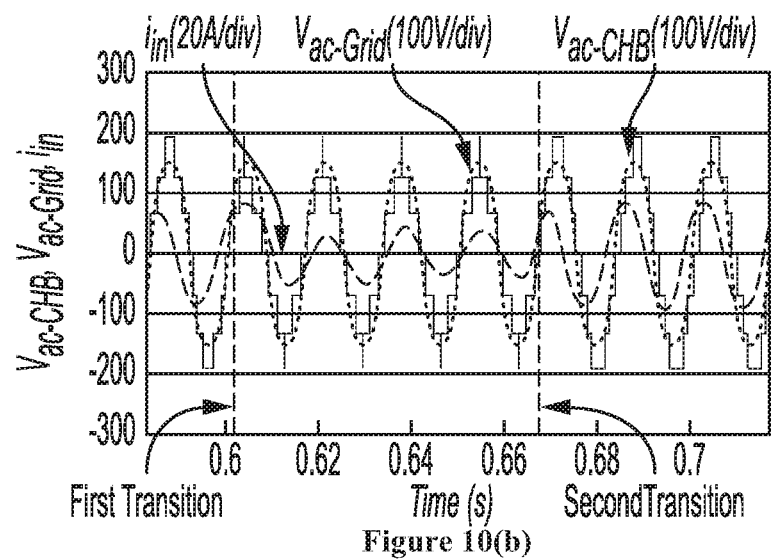
FIG. 10(b) shows a first simulation result of $V_{ac\text{-}CHB}$, $V_{ac\text{-}Grid}$, and $I_{in}$ for a four-quadrant converter according to an embodiment of the subject invention.
Figure 10C:
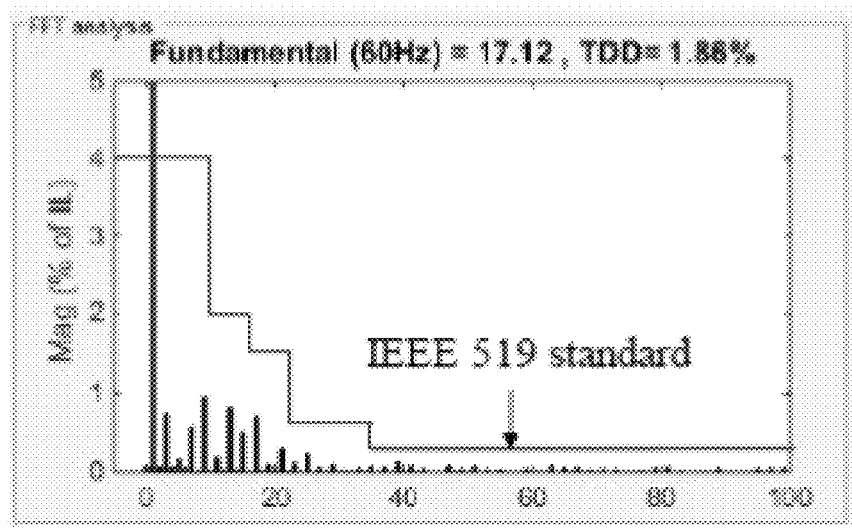
FIG. 10(c) shows a first simulation result of harmonic spectrum at 1000W−1000VAR for a four-quadrant converter according to an embodiment of the subject invention.
Figure 10D:
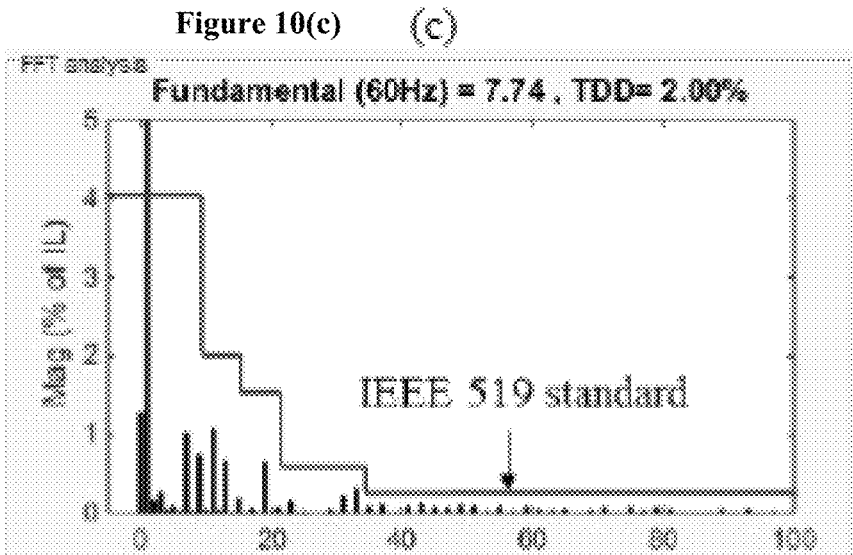
FIG. 10(d) shows a first simulation result of harmonic spectrum at 200W+250VAR for a four-quadrant converter according to an embodiment of the subject invention.

FIGS. 10(a)-10(d) show first simulation results for a conventional four-quadrant converter and a four-quadrant converter according to an embodiment of the subject invention. In the first comparative simulations, the active and reactive power flowing from power grid to the converter changed from 1000W−1000VAR to 200W+250VAR at t=0.60231 seconds (s) and then changed back to 1000W−1000VAR at t=0.6667 s. In the first simulation in FIG. 10(a) for a conventional SHCM-PWM technique, during the transient condition, when the active and reactive powers are changed, more than two fundamental cycles are required to reach steady state. The DC offset of the current $i_{in}$ lasts for more than two cycles. The maximum DC offset shown in Table III is 43%-78%. This DC offset can lead to instability. The waveforms in FIG. 10(b) are for a hybrid technique of an embodiment of the subject invention. During the transient condition, the active power and reactive power are changed separately within one cycle with the conditions defined in equation (17). Referring to FIG. 10(b), $i_{in}$ reaches the steady state within less than one cycle. The maximum 1.75%-8.5% DC offset is negligible as shown in Table III. The carrier frequency of the PSPWM technique under dynamic condition is 240 Hz as derived in equation (20). The harmonic spectrum of $i_{in}$ with the embodiment, when the active and reactive power is 1000W−1000VAR, is shown in FIG. 10(c). The modulation index of $v_{ac\text{-}CHB}$ is 2.399, which is within the modulation index range of the conventional technique in FIG. 4. The harmonic spectrum of $i_{in}$ with the embodiment of the subject invention, when the active and reactive power is 200W+250VAR, is shown in FIG. 10(d). The modulation index is 1.647, which is inside the extended modulation index range in FIG. 4. As shown in FIGS. 10(c) and 10(d), with the embodiment of the subject invention, the harmonic spectra of $i_{in}$ can meet IEEE 519 current harmonic limits.

TABLE III

THE MAXIMUM DC OFFSET OF $I_{IN}$ IN SIMULATIONS WITH EITHER CONVENTIONAL OR PROPOSED TECHNIQUES

| Comparative Simulations | 1st transition (conventional) | 1st transition (proposed) | 2nd transition (conventional) | 2nd transition (proposed) |
|---|---|---|---|---|
| 1 | 78% | 8.5% | 43% | 1.75% |
| 2 | 92% | 3.8% | 94% | 1.4% |

Figure 11A:
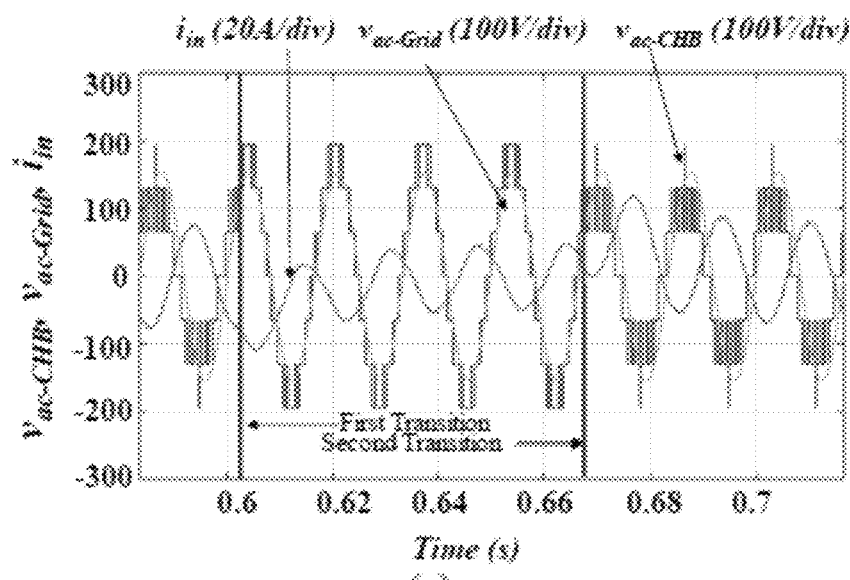
FIG. 11(a) shows a second simulation result of $V_{ac\text{-}CHB}$, $V_{ac\text{-}Grid}$, and $I_{in}$ for a conventional four-quadrant converter.
Figure 11B:
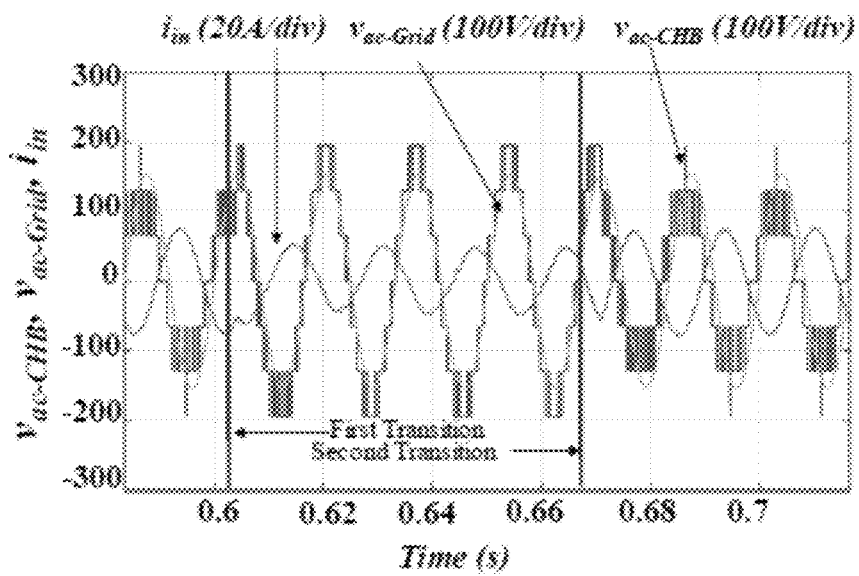
FIG. 11(b) shows a second simulation result of $V_{ac\text{-}CHB}$, $V_{ac\text{-}Grid}$, and $I_{in}$ for a four-quadrant converter according to an embodiment of the subject invention.
Figure 11C:
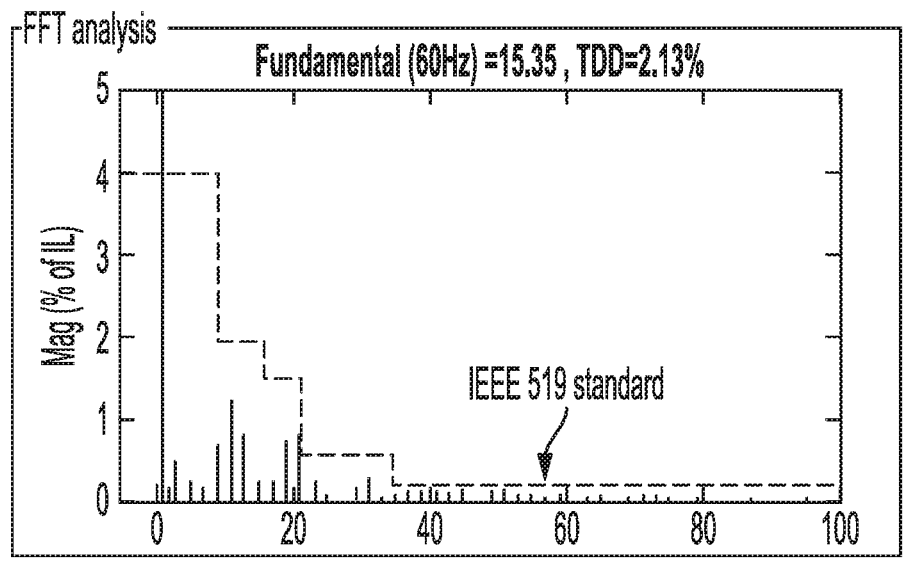
FIG. 11(c) shows a second simulation result of harmonic spectrum at −850W+825VAR for a four-quadrant converter according to an embodiment of the subject invention.
Figure 11D:
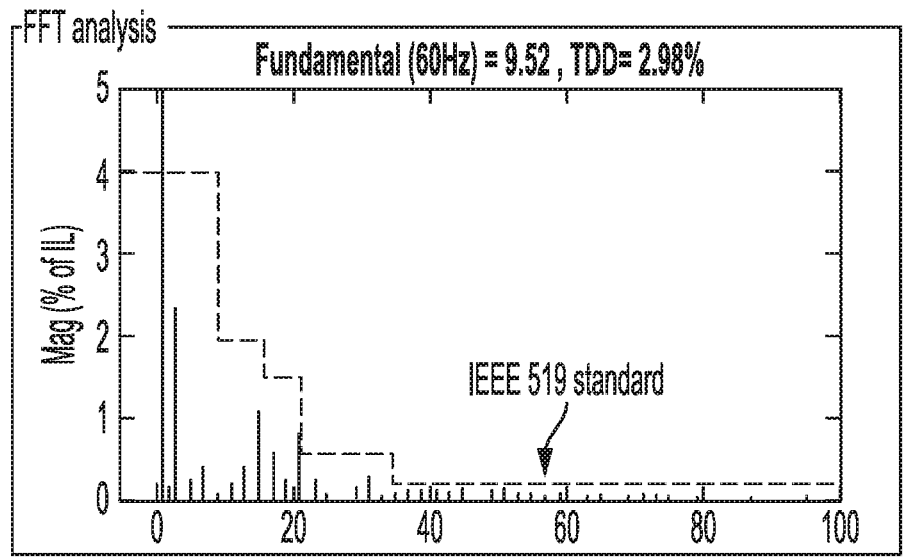
FIG. 11(d) shows a second simulation result of harmonic spectrum at −500W−600VAR for a four-quadrant converter according to an embodiment of the subject invention.

FIGS. 11(a)-11(d) show second simulation results for a conventional four-quadrant converter and a four-quadrant converter according to an embodiment of the subject invention. In the second comparative simulations, the active and reactive power flowing from power grid to the converter change from −850W+825VAR to −500W−600VAR at t=0.6023 s and then change back to −850W+825VAR at t=0.6667 s. In FIG. 11(a), for the conventional SHCM-PWM technique, during the transient condition, when the active and reactive powers are changed, more than two fundamental cycles are required to reach steady state. A huge 92%-94% DC offset shown in Table III is observed in the current $i_{in}$, and it lasts for more than two cycles. This DC offset can lead to instability on the controller. FIG. 11(b) shows a second simulation result of $V_{ac\text{-}CHB}$, $v_{ac\text{-}Grid}$ and $I_{in}$ for a four-quadrant converter according to an embodiment of the subject invention. During the transient condition, the active power and reactive power are changed separately within one cycle with the conditions defined in equation (17). Referring to FIG. 11(b), $i_{in}$ reaches the steady state within less than one cycle. The maximum 1.4%-3.8% DC offset is negligible as shown in Table III. The carrier frequency of the PSPWM technique under dynamic condition is 240 Hz as derived in equation (20). The harmonic spectrum of $i_{in}$ at −850W+825VAR with a 1.52 modulation index, which is inside the extended modulation index range in FIG. 4, is shown in FIG. 11(c). The harmonic spectrum of $i_{in}$ at −500W−600VAR is shown in FIG. 11(d). The modulation index is 2.274, which is inside the conventional modulation index range in FIG. 4. It is apparent that the harmonics of $i_{in}$ for both conditions meet the current harmonic limits of IEEE 519.

Example 2

Figure 12:
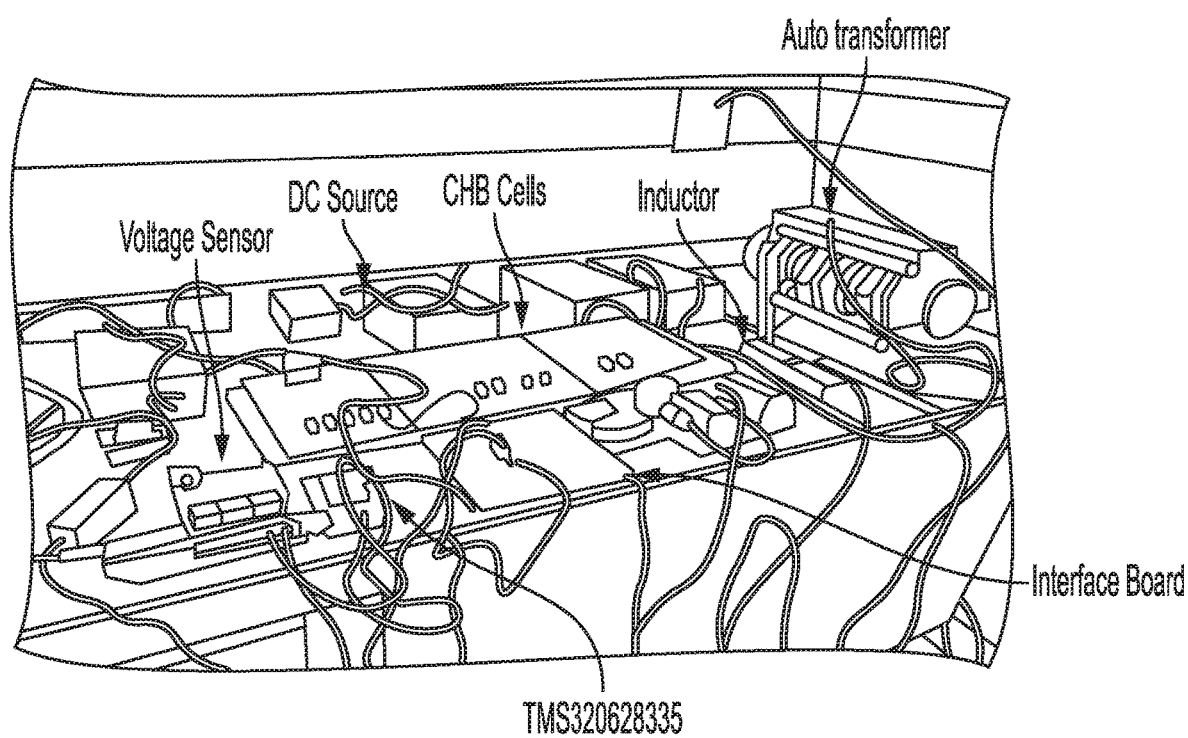
FIG. 12 shows a hardware prototype of a four-quadrant CHB.

A 7-level four-quadrant CHB converter according to an embodiment of the subject invention, having the same parameters as in the simulations, was fabricated and investigated. FIG. 12 shows a hardware prototype of such a four-quadrant CHB. The TMS320F28335 DSP was used in the prototype. Similar to FIGS. 10(a)-10(d), in the first comparative experiments, the active and reactive power flowing from power grid to the converter changed from 1000W−1000VAR to 200W+250VAR and then changed back to 1000W−1000VAR. The transient periods are between the two red (vertical) lines in FIGS. 13(a), 13(b), 14(a), and 14(b).

Figure 13A:
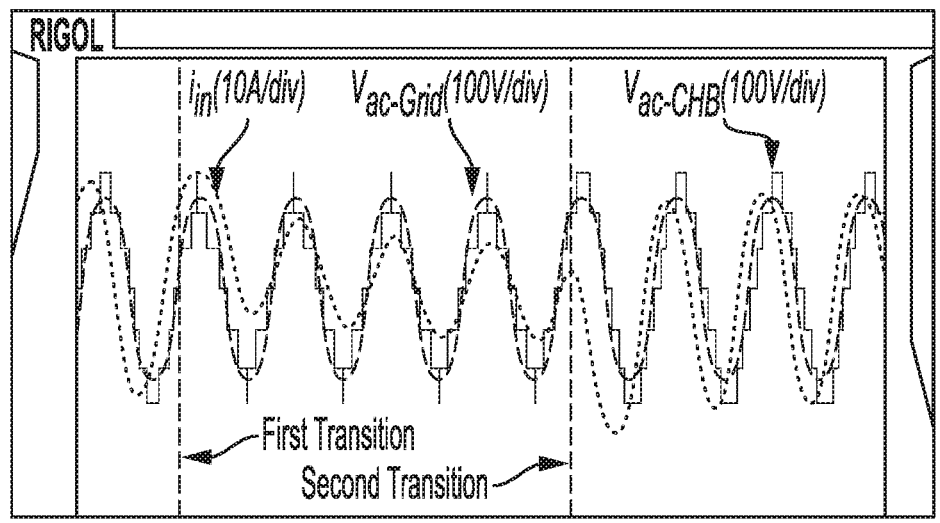
FIG. 13(a) shows a first experimental result of $V_{ac\text{-}CHB}$, $V_{ac\text{-}Grid}$, and $I_{in}$ for a conventional four-quadrant converter.
Figure 13B:
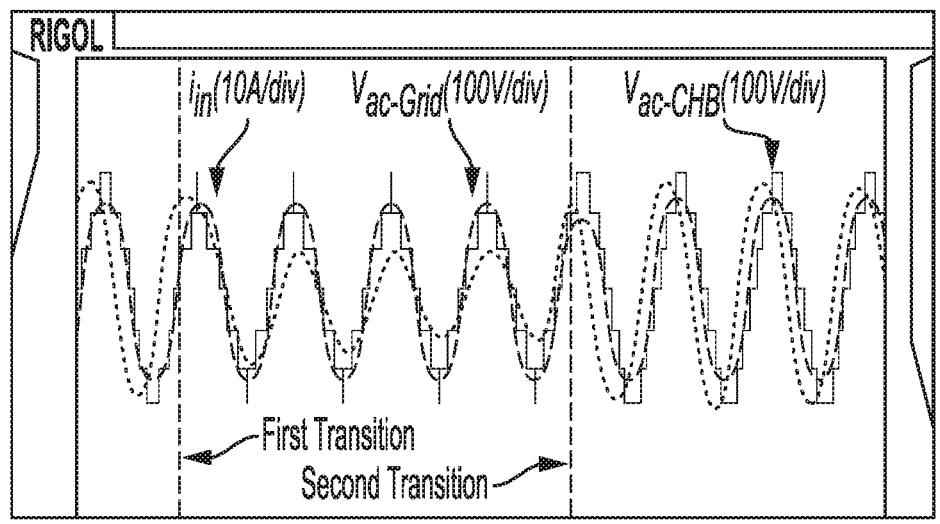
FIG. 13(b) shows a first experimental result of $V_{ac\text{-}CHB}$, $V_{ac\text{-}Grid}$, and $I_{in}$ for a four-quadrant converter according to an embodiment of the subject invention.
Figure 13C:
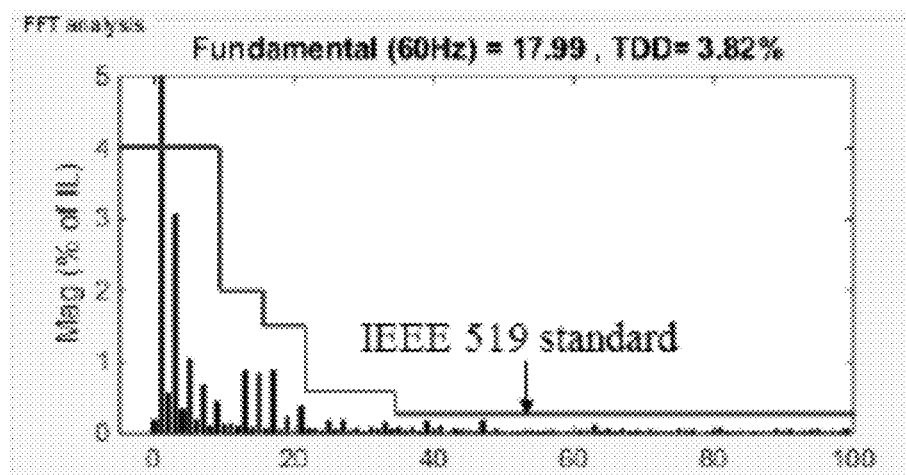
FIG. 13(c) shows a first experimental result of harmonic spectrum at 1000W−1000VAR for a four-quadrant converter according to an embodiment of the subject invention.
Figure 13D:
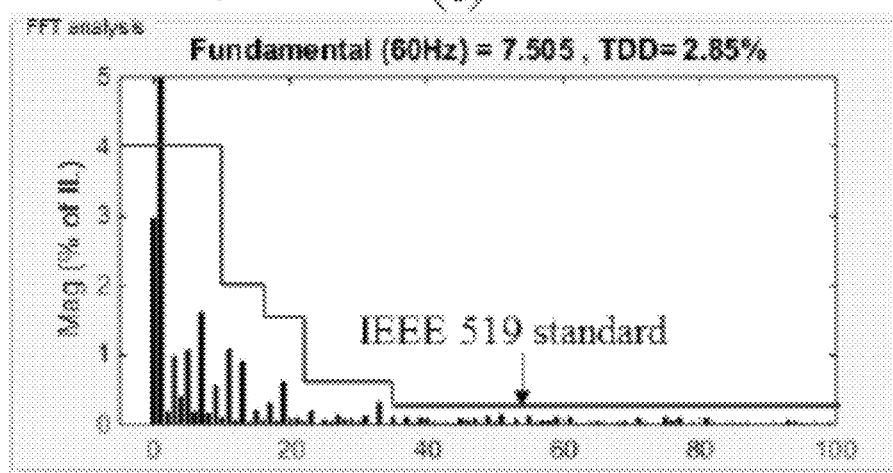
FIG. 13(d) shows a first experimental result of harmonic spectrum at 200W+250VAR for a four-quadrant converter according to an embodiment of the subject invention.

FIGS. 13(a)-13(d) show first experimental results for a conventional four-quadrant converter and a four-quadrant converter according to an embodiment of the subject invention. In FIG. 13(a), the conventional technique with SHCM-PWM takes at least two fundamental cycles to reach the steady state. A 35%-65% DC offset is observed in $i_{in}$ in Table IV during the transient. This large DC offset can lead to instability of the controller and can reduce the reliability of the semiconductor switches. FIG. 13(b) shows a first experimental result of $V_{ac\text{-}CHB}$, $v_{ac\text{-}Grid}$, and $I_{in}$ for a four-quadrant converter according to an embodiment of the subject invention. In FIG. 13(b), for the hybrid technique of an embodiment of the subject invention, which complies with the condition derived in equation (17), each of the d and q components changes once in one cycle. It takes less than one cycle to reach steady state. The 2.5%-12% DC offset is much smaller than that of the conventional technique as shown in Table IV. The switching frequency of the PSPWM technique is 240 Hz as derived in equation (20). The current harmonic spectra of $i_{in}$ in steady state at both 1000W−1000VAR and 200W+250VAR are shown in FIGS. 13(c) and 13(d), respectively. Both harmonic spectra can meet the IEEE 519 current harmonic limits. The modulation indices for both conditions are the same as the simulation results. This confirms the extended modulation index range in FIG. 4.

TABLE IV

THE MAXIMUM DC OFFSET OF $I_{IN}$ IN EXPIEREMENTS WITH EITHER CONVENTIONAL OR PROPOSED TECHNIQUES

| Experiment number | First transition (conventional) | First transition (proposed) | Second transition (conventional) | Second transition (proposed) |
|---|---|---|---|---|
| First | 65% | 12% | 35% | 2.5% |
| Second | 60% | 5% | 37% | 5.8% |

Figure 14A:
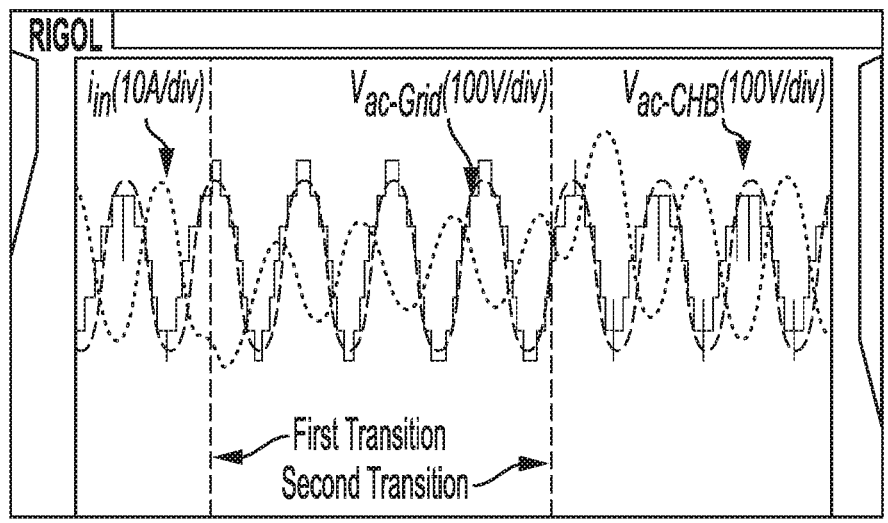
FIG. 14(a) shows a second experimental result of $V_{ac\text{-}CHB}$, $V_{ac\text{-}Grid}$, and $I_{in}$ for a conventional four-quadrant converter.
Figure 14B:
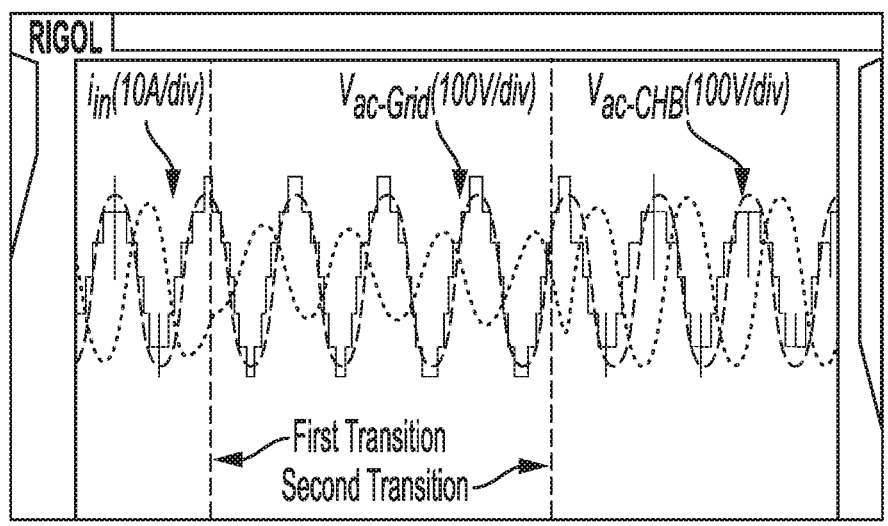
FIG. 14(b) shows a second experimental result of $V_{ac\text{-}CHB}$, $V_{ac\text{-}Grid}$, and $I_{in}$ for a four-quadrant converter according to an embodiment of the subject invention.
Figure 14C:
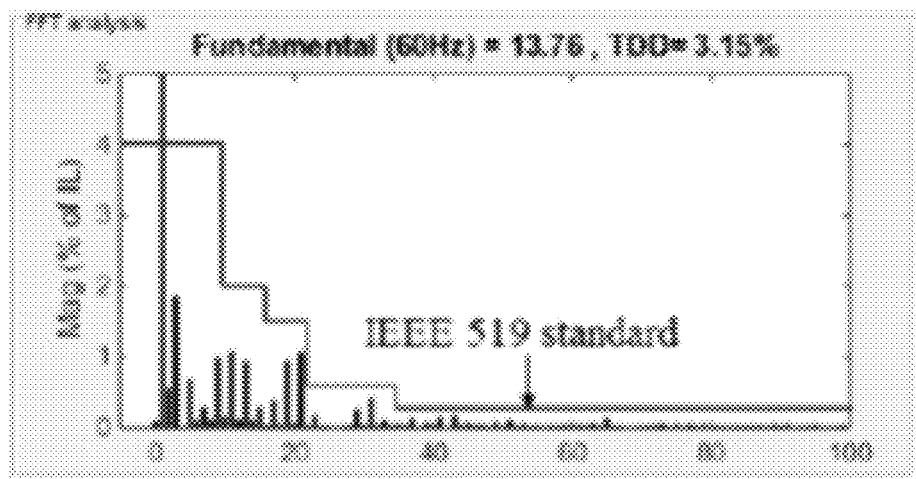
FIG. 14(c) shows a second experimental result of harmonic spectrum at −850W+825VAR for a four-quadrant converter according to an embodiment of the subject invention.
Figure 14D:
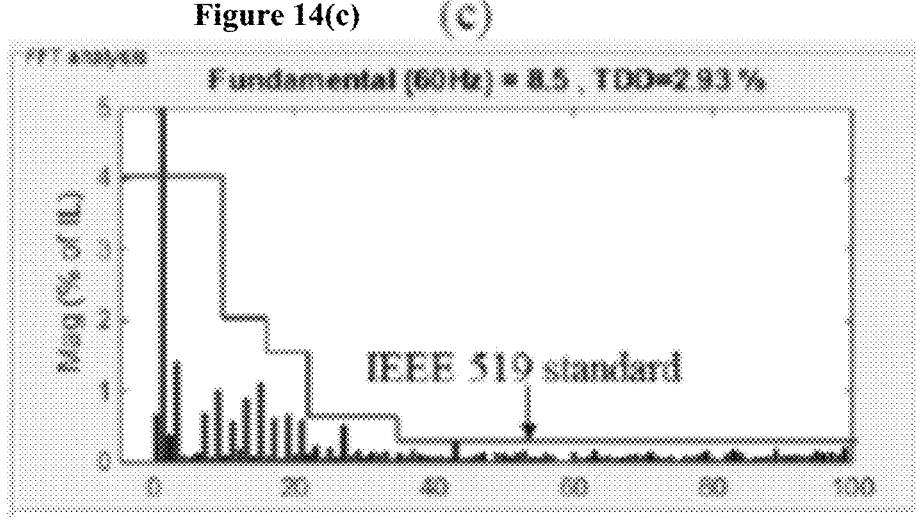
FIG. 14(d) shows a second experimental result of harmonic spectrum at −500W−600VAR for a four-quadrant converter according to an embodiment of the subject invention.

FIGS. 14(a)-14(d) show second experimental results for a conventional four-quadrant converter and a four-quadrant converter according to an embodiment of the subject invention. In the second comparative experiments, the active and reactive power flowing from power grid to the converter change from −850W+825VAR to −500W−600VAR and then change back to −850W+825VAR. Referring to FIG. 14 (a), the conventional technique takes at least two fundamental cycles to achieve steady state. A 37%-60% DC offset is observed during the transient in Table IV. In FIG. 14 (b), the hybrid technique of the embodiment of the subject invention takes less than one cycle to reach steady state with only a 5%-5.8% DC offset during the transient condition. FIGS. 14(c) and 14(d) show that the current harmonic spectra of $i_{in}$ meet IEEE 519 current harmonic limits under both conditions.

As demonstrated by both experimental and simulation results, with the hybrid techniques of embodiments of the subject invention, the CHB rectifier can process four-quadrant active and reactive power with the extended modulation index, achieve fast dynamic response, and meet IEEE-519 current harmonic limits.

The hybrid techniques of embodiments of the subject invention can achieve a transient free dynamic response because of the non-ideal component parameters, such as the variations of the DC link voltages, the resistance of the inductor, and the impedance of power grid (as well as possibly others), while maintaining a small DC offset during the transient condition. In addition, compared with conventional techniques, the hybrid techniques of embodiments of the subject invention significantly improve the dynamic response.

Example 3

Figure 15A:
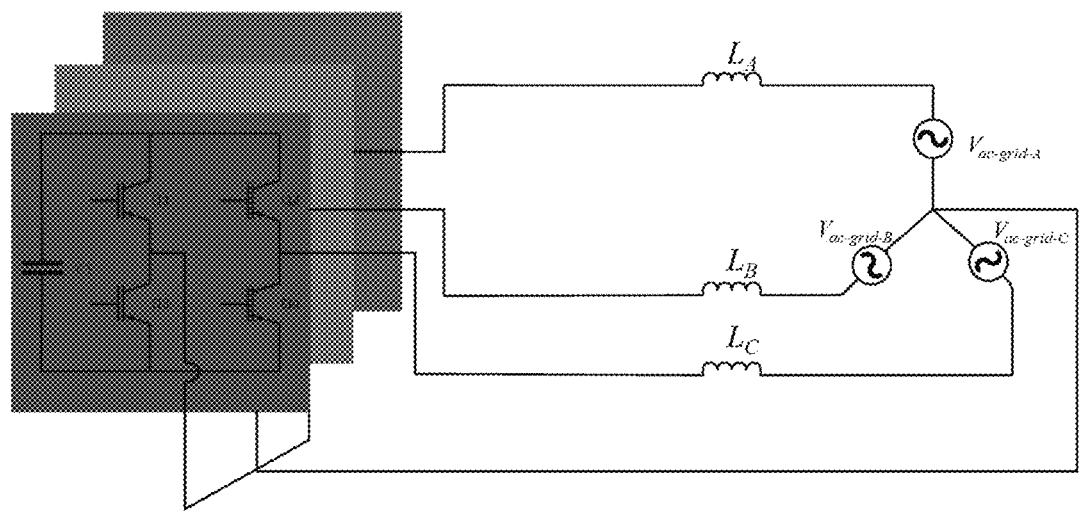
FIG. 15(a) shows a grid-tied converter according to an embodiment of the subject invention.
Figure 15B:
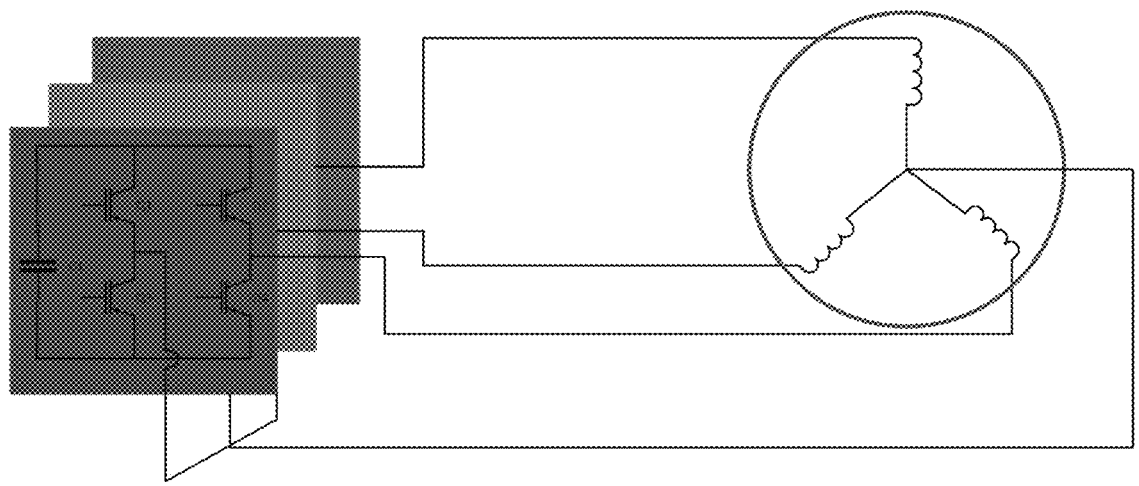
FIG. 15(b) shows a three-phase asynchronous motor according to an embodiment of the subject invention.
Figure 15C:
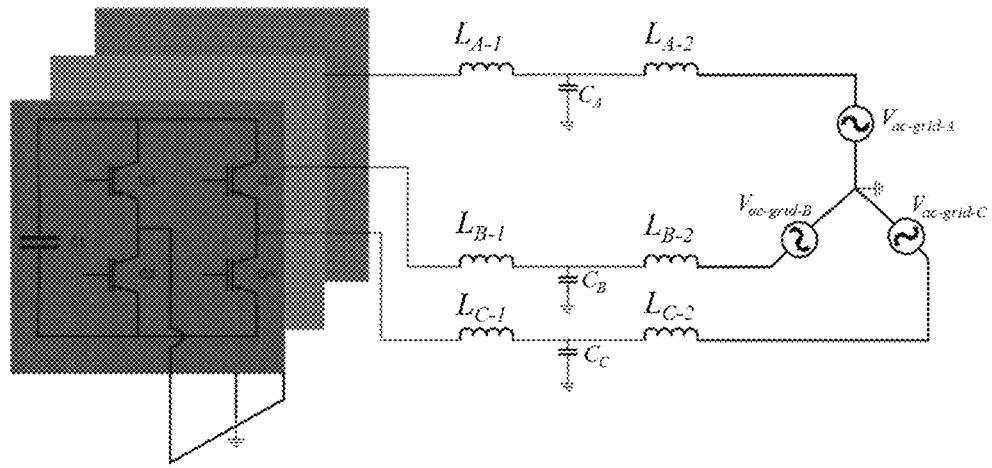
FIG. 15(c) shows a filter according to an embodiment of the subject invention.

FIGS. 15(a)-15(c) show another example according to an embodiment of the subject invention. FIG. 15(a) shows a grid-tied converter that selectively uses a selective harmonic current mitigation pulse width modulation (SHCM-PWM) unit and a phase shift pulse width modulation (PSPWM) unit. Referring to FIGS. 6 and 15(a), the grid-tied converter of FIG. 15(a), indicated as colored H bridges, replaces the position of the CHB converter of FIG. 6, thereby providing high efficiency and high dynamic performance. The grid-tied converter further includes inductors $L_A$, $L_B$, and $L_C$ connected to a grid such as Neutral Point Clamped (NPC) and Flying Capacitor (FC).

FIG. 15(b) shows a three-phase asynchronous motor according to an embodiment of the subject invention. Similar to FIG. 15(a), the three-phase asynchronous motor replaces the position of the CHB converter of FIG. 6, thereby improving the dynamic performance in drive application using the three-phase asynchronous motor. The motor can be a single phase asynchronous motor.

FIG. 15(c) shows a filter according to an embodiment of the subject invention. Similar to FIGS. 15(a) and 15(b), the filter replaces the position of the CHB converter of FIG. 6, thereby improving dynamic performance in any kind of passive filter. The filter includes any kind of passive filters including an L filter, an LC filter, and an LCL filter.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

REFERENCES

[1] Khomfoi, S., and Tolbert, L. M.: 'Multilevel Power Rectifiers', Power Electronics Handbook, The University of Tennessee, Department of Electrical and Computer Engineering, Knoxville, Tenn., USA.

[2] Dahidah, M. S. A.; Konstantinou, G.; Agelidis, V. G., "A Review of Multilevel Selective Harmonic Elimination PWM: Formulations, Solving Algorithms, Implementation and Applications," in *Power Electronics, IEEE Transactions on*, vol. 30, no. 8, pp. 4091-4106, August 2015.

[3] L. He, J. Xiong, H. Ouyang, P. Zhang and K. Zhang, "High-Performance Indirect Current Control Scheme for Railway Traction Four-Quadrant Converters," in IEEE Transactions on Industrial Electronics, vol. 61, no. 12, pp. 6645-6654, December 2014.

[4] Watson, A. J.; Wheeler, P. W.; Clare, J. C., "A Complete Harmonic Elimination Approach to DC Link Voltage Balancing for a Cascaded Multilevel Rectifier," in *Industrial Electronics, IEEE Transactions on*, vol. 54, no. 6, pp. 2946-2953, December 2007.

[5] Franquelo, L. G., Napoles, J., Guisado, R. C. P., Leon, J. I., and Aguirre, M. A.: 'A Flexible Selective Harmonic Mitigation Technique to Meet Grid Codes in Three-Level PWM Rectifiers' Industrial Electronics, IEEE Transactions on, December 2007, vol. 54, no. 6, pp. 3022-3029.

[6] A. Moeini, H. Zhao, and S. Wang "A Current Reference based Selective Harmonic Current Mitigation PWM Technique for Cascaded H-bridge Multilevel Active Rectifiers with Small Coupling Inductance, Extended Harmonic Reduction Spectrum and the Ability to Reduce the Harmonic Currents due to Grid Voltage Harmonics" IEEE Transaction on Industrial Electronics, 2017.

[7] A. Moeini, Z. Hui and S. Wang, "High efficiency, hybrid Selective Harmonic Elimination phase-shift PWM technique for Cascaded H-Bridge inverters to improve dynamic response and operate in complete normal modulation indices," 2016 IEEE Applied Power Electronics Conference and Exposition (APEC), Long Beach, C A, 2016, pp. 2019-2026.

[8] H. Zhao and S. Wang, "A four-quadrant modulation technique for Cascaded Multilevel Inverters to extend solution range for Selective Harmonic Elimination/Compensation," 2016 IEEE Applied Power Electronics Conference and Exposition (APEC), Long Beach, C A, 2016, pp. 3603-3610.

[9] A. Moeini, H. Iman-Eini and M. Bakhshizadeh, "Selective harmonic mitigation-pulse-width modulation technique with variable DC-link voltages in single and three-phase cascaded H bridge inverters," in IET Power Electronics, vol. 7, no. 4, pp. 924-932, April 2014.
[10] S. Wang, R. Crosier and Y. Chu, "Investigating the power architectures and circuit topologies for megawatt superfast electric vehicle charging stations with enhanced grid support functionality," *Electric Vehicle Conference (IEVC), IEEE International*, Greenville, S C, 2012, pp. 1-8.
[11] IEEE Std 519, IEEE Recommended Practices and Requirements for Harmonic Control in Electrical Power Systems, New York.
[12] Reyes-Sierra, Margarita, and C A Coello Coello. "Multi-objective particle swarm optimizers: A survey of the state-of-the-art." *International journal of computational intelligence research* 2.3 (2006): 287-308.
[13] V. G. Agelidis, A. I. Balouktsis and M. S. A. Dahidah, "A Five-Level Symmetrically Defined Selective Harmonic Elimination PWM Strategy: Analysis and Experimental Validation," in *IEEE Transactions on Power Electronics*, vol. 23, no. 1, pp. 19-26, January 2008.
[14] Holmes, D. G. and T. A. Lipo (2003). Pulse Width Modulation for Power Converters: Principles and Practice, John Wiley & Sons.

What is claimed is:

1. A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$; and
a CHB converter selectively coupled to the SHCM-PWM unit if the input current satisfies a first predetermined condition, or to the PSPWM unit if the input current satisfies a second predetermined condition.

2. The hybrid CHB converter according to claim 1, wherein the CHB converter is coupled to the SHCM-PWM unit under steady state condition and the CHB converter is coupled to the PSPWM unit under dynamic condition.

3. The hybrid CHB converter according to claim 2, wherein the CHB converter is coupled to the PSPWM unit under transient condition.

4. The hybrid CHB converter according to claim 2, wherein the input current includes an active current reference $\Delta I^*_{in-d}$ and a reactive current reference $\Delta I^*_{in-q}$, and the CHB converter is selectively coupled to the SHCM-PWM unit and the PSPWM unit based on the active current reference $\Delta I^*_{in-d}$ and the reactive current reference $\Delta^*_{in-q}$.

5. The hybrid CHB converter according to claim 4, wherein the CHB converter is selectively coupled to the PSPWM unit in case the input current satisfies the following first predetermined condition Formula 1:

$\Delta I^*\text{in-}d>0$ & $\omega t=k\pi$, until $\omega t=(k+2)\pi$.

6. The hybrid CHB converter according to claim 5, wherein the CHB converter is selectively coupled to the PSPWM unit in case the input current satisfies the second condition 2:

$\Delta I^*\text{in-}q>0$ & $\omega t=k\pi+\pi/2$, until $\omega t=(k+2)\pi$.

7. The hybrid CHB converter according to claim 6, wherein the CHB converter is selectively coupled to the SHCM-PWM unit in all cases where the input current does not satisfy either of condition 1 and condition 2.

8. The hybrid CHB converter according to claim 2, further comprising an indirect controller coupled to the input current and providing an output current $v_{ac\text{-}CHB2}$ to the SHCM-PWM unit and the PSPWM unit.

9. A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW; and
a CHB converter coupled to the output signal SW of the modulation selector, based on if the input current satisfies a third predetermined condition or a fourth predetermined condition.

10. The hybrid CHB converter according to claim 9, wherein the modulation selector is connected to the input current.

11. The hybrid CHB converter according to claim 10, wherein the modulation selector selects one of the output signal $SW_{SHSM}$ and the output signal $SW_{PS}$ as the output signal SW based on the input current.

12. The hybrid CHB converter according to claim 11, further comprising an indirect controller coupled to the input current and providing an output current $v_{ac\text{-}CHB2}$ to the SHCM-PWM unit and the PSPWM unit.

13. The hybrid CHB converter according to claim 12, wherein the input current includes an active current reference $\Delta I^*_{in-d}$ and a reactive current reference $\Delta I^*_{in-q}$, and the modulation selector selects one of the output signal $SW_{SHCM}$ and the output signal $SW_{PS}$ based on the active current reference $\Delta I^*_{in-d}$ and the reactive current reference $\Delta I^*_{in-q}$.

14. The hybrid CHB converter according to claim 13, wherein the modulation selector selects the output signal $S_{WPS}$ in case the input current satisfies the third predetermined condition 3 and fourth predetermined condition 4:

$\Delta I^*\text{in-}d>0$ & $\omega t=\pi t$, until $\omega t=(k+2)\pi$,    condition 3

$\Delta I^*\text{in-}q>0$ & $\omega t=\pi t+\pi/2$, until $\omega t=(k+2)\pi$    condition 4.

15. The hybrid CHB converter according to claim 14, the modulation selector selects the output signal $SW_{SHCM}$ in all cases where the input current does not satisfy both condition 3 and condition 4.

16. The hybrid CHB converter according to claim 12, further comprising a phase lock loop (PLL) coupled to the modulation selector and an output of the CHB converter.

17. A four-quadrant Cascaded H-Bridge (CHB) converter, comprising:
a selective harmonic current mitigation pulse width modulation (SHCM-PWM) unit receiving an active power and a reactive power from a power grid;
a phase shift pulse width modulation (PSPWM) unit receiving the active power and the reactive power from the power grid; and
a CHB converter selectively coupled to the SHCM-PWM unit at steady state and the PSPWM unit at transient state.

18. The four-quadrant CHB converter according to claim 17, wherein the active power and the reactive power are changed separately within one cycle.

19. The four-quadrant CHB converter according to claim 17, wherein a switching frequency of the PSPWM unit is 240 Hz.

20. The four-quadrant CHB converter according to claim 17, wherein a modulation index with the SHCM-PWM unit is in a range of 0.8 to 2.495.

21. A hybrid Cascaded H-Bridge (CHB) converter, comprising:
- a selective harmonic current mitigation pulse width modulation (SHCM-PWM) unit coupled to an input current and providing an output signal $SW_{SHCM}$;
- a phase shift pulse width modulation (PSPWM) unit coupled to the input current and providing an output signal $SW_{PS}$; and
- a CHB converter selectively coupled to the SHCM-PWM unit and the PSPWM unit;
- wherein the CHB converter is coupled to the SHCM-PWM unit under steady state condition and the CHB converter is coupled to the PSPWM unit under dynamic condition; and
- wherein the input current includes an active current reference $\Delta I^*_{in-d}$ and a reactive current reference $\Delta I^*_{in-q}$, and the CHB converter is selectively coupled to the SHCM-PWM unit and the PSPWM unit based on the active current reference $\Delta I^*_{in-d}$ and the reactive current reference $\Delta I^*_{in-q}$.

22. The hybrid CHB converter according to claim 21, wherein the CHB converter is selectively coupled to the PSPWM unit in case the input current satisfies the first predetermined condition 1:

$$\Delta I^*\text{in-}d > 0 \ \& \ \omega t = \pi, \text{ until } \omega t = (k+2)\pi.$$

23. The hybrid CHB converter according to claim 22, wherein the CHB converter is selectively coupled to the PSPWM unit in case the input current satisfies the second condition 2:

$$\Delta I^*\text{in-}q > 0 \ \& \ \omega t = \pi t + \pi/2, \text{ until } \omega t = (k+2)\pi.$$

24. The hybrid CHB converter according to claim 23, wherein the CHB converter is selectively coupled to the SHCM-PWM unit in all cases where the input current does not satisfy either of condition 1 and condition 2.

* * * * *

UNITED STATES PATENT AND TRADEMARK OFFICE
CERTIFICATE OF CORRECTION

PATENT NO. : 10,601,305 B2
APPLICATION NO. : 15/883390
DATED : March 24, 2020
INVENTOR(S) : Wang et al.

Page 1 of 1

It is certified that error appears in the above-identified patent and that said Letters Patent is hereby corrected as shown below:

In the Claims

Column 19
Line 52, in Claim 5, delete "following"

Signed and Sealed this
Seventh Day of July, 2020

Andrei Iancu
*Director of the United States Patent and Trademark Office*